US012719160B2

(12) United States Patent
Kim et al.

(10) Patent No.: US 12,719,160 B2
(45) Date of Patent: Aug. 25, 2026

(54) ELECTRONIC DEVICE COMPRISING DISPLAY AND ANTENNA DISPOSED ADJACENT TO DISPLAY

(71) Applicant: Samsung Electronics Co., Ltd., Suwon-si (KR)

(72) Inventors: Jongmin Kim, Suwon-si (KR); Sangho Hong, Suwon-si (KR); Myounggyo Seo, Suwon-si (KR); Hyoseok Na, Suwon-si (KR); Gunhee Park, Suwon-si (KR); Yongam Son, Suwon-si (KR); Jongkwan Lee, Suwon-si (KR); Hanyeop Lee, Suwon-si (KR); Taihwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/675,871

(22) Filed: May 28, 2024

(65) Prior Publication Data

US 2024/0313395 A1 Sep. 19, 2024

Related U.S. Application Data

(63) Continuation of application No. PCT/KR2022/018880, filed on Nov. 25, 2022.

(30) Foreign Application Priority Data

Nov. 25, 2021 (KR) ........................ 10-2021-0164895

(51) Int. Cl.

| | |
|---|---|
| ***H01Q 1/52*** | (2006.01) |
| ***H01Q 1/22*** | (2006.01) |
| ***H01Q 1/24*** | (2006.01) |

(52) U.S. Cl.

CPC ........... *H01Q 1/526* (2013.01); *H01Q 1/2266* (2013.01); *H01Q 1/243* (2013.01)

(58) Field of Classification Search

CPC ......... H01Q 1/2266; H01Q 1/24; H01Q 1/243; H01Q 1/38; H01Q 1/52; H01Q 1/526; H04M 1/02

See application file for complete search history.

(56) References Cited

U.S. PATENT DOCUMENTS 5,899,549 A 5/1999 Nakanishi et al.
11,228,091 B2 * 1/2022 Cha ........................ H01Q 5/342

(Continued)

FOREIGN PATENT DOCUMENTS

JP H09218649 A 8/1997
JP 2013168894 A 8/2013

(Continued)

OTHER PUBLICATIONS

International Search Report for PCT/KR2022/018880 dated Feb. 28, 2023, 5 pages.

(Continued)

*Primary Examiner* — Thien M Le
(74) *Attorney, Agent, or Firm* — Nixon & Vanderhye, P.C.

(57) ABSTRACT

According to various embodiments disclosed herein, an electronic device comprises: a housing; a display; a ground sheet disposed on the rear surface of the display; a substrate disposed in an inner space of the housing; an antenna disposed on at least one side of the housing; and a flexible sheet having a display drive circuit (DDI) configured to control the display, disposed thereon, wherein openings that pass through the flexible sheet are formed in an area between the display drive circuit and the antenna, conductive members comprising a conductive material are disposed in the (Continued)

openings, and the conductive members are electrically connected to the ground sheet, thereby reducing the noise induced in the antenna.

20 Claims, 22 Drawing Sheets

(56) References Cited

U.S. PATENT DOCUMENTS

| | | | | |
|---|---|---|---|---|
| 2015/0062466 | A1 | 3/2015 | Yun | |
| 2017/0207516 | A1 | 7/2017 | Koo et al. | |
| 2020/0021016 | A1 | 1/2020 | Son et al. | |
| 2020/0136243 | A1 | 4/2020 | Shin et al. | |
| 2020/0137881 | A1 | 4/2020 | Lim | |
| 2020/0235463 | A1 | 7/2020 | Cha et al. | |
| 2020/0357361 | A1 | 11/2020 | Park et al. | |
| 2021/0168973 | A1 | 6/2021 | Sim et al. | |
| 2021/0216112 | A1 | 7/2021 | Shin et al. | |
| 2021/0328338 | A1* | 10/2021 | Da Costa Bras Lima | H01Q 5/385 |
| 2022/0183173 | A1* | 6/2022 | Kim | G06F 1/1698 |
| 2023/0084310 | A1* | 3/2023 | Cooper | H01Q 1/38 343/702 |
| 2023/0099917 | A1* | 3/2023 | Liu | H01Q 21/29 343/702 |
| 2023/0195186 | A1* | 6/2023 | Kim | H04B 1/3827 |
| 2025/0087873 | A1* | 3/2025 | Poore | H01Q 1/38 |
| 2025/0112367 | A1* | 4/2025 | Zhao | H01Q 1/243 |
| 2025/0243434 | A1* | 7/2025 | Sunder | C11D 17/00 |

FOREIGN PATENT DOCUMENTS

| | | | |
|---|---|---|---|
| JP | 2015191983 | A | 11/2015 |
| KR | 20150025356 | A | 3/2015 |
| KR | 20160002015 | U | 6/2016 |
| KR | 10-2017-0087334 | | 7/2017 |
| KR | 10-2017-0094748 | | 8/2017 |
| KR | 20190021727 | A | 3/2019 |
| KR | 20190024178 | A | 3/2019 |
| KR | 20190121469 | A | 10/2019 |
| KR | 20200008408 | A | 1/2020 |
| KR | 10-2020-0037953 | | 4/2020 |
| KR | 20200047811 | A | 5/2020 |
| KR | 20210128254 | A | 10/2021 |

OTHER PUBLICATIONS

Written Opinion of the ISA for PCT/KR2022/018880 dated Feb. 28, 2023, 3 pages.

Decision on Grant dated Dec. 17, 2025 in Korean Patent Application No. 10-2021-0164895 and English-language translation.

* cited by examiner

ELECTRONIC DEVICE COMPRISING DISPLAY AND ANTENNA DISPOSED ADJACENT TO DISPLAY

CROSS-REFERENCE TO RELATED APPLICATIONS

This application is a continuation of International Application No. PCT/KR2022/018880 designating the United States, filed on Nov. 25, 2022, in the Korean Intellectual Property Receiving Office and claiming priority to Korean Patent Application No. 10-2021-0164895, filed on Nov. 25, 2021, in the Korean Intellectual Property Office, the disclosures of each of which are incorporated by reference herein in their entireties.

BACKGROUND

Field

The disclosure relates to a display and an including an antenna disposed adjacent to the display.

Description of Related Art

Recently, electronic devices (e.g., smartphones) have been introduced that adopt a so-called full display structure for minimizing/reducing the bezel and enlarging the active area. An electronic device adopting the full display structure has a display drive IC (hereinafter, 'DDI') and an antenna disposed adjacent to the display and may experience deterioration of antenna performance due to noise caused from the antenna by the DDI when the display is powered on. As an example, when a signal is transmitted from the antenna (e.g., when the maximum Tx power is generated from the antenna), the Tx power is induced in the DDI, and the induced Tx power and the DDI low-frequency noise are mutually modulated. The modulated noise is reinduced at the antenna, significantly deteriorating the reception (Rx) sensitivity of the antenna.

To address deterioration of antenna reception sensitivity as described above, it is preferable to shield the antenna and the DDI from each other but, due to recent design requirements for lighter and more compact electronic devices, it may be hard to adopt a structure for electromagnetically shielding the antenna and the DDI completely.

Thus, a DDI shielding member, e.g., in the form of a film or a tape, may be applied to shield between the DDI and the antenna, but this way cannot fully prevent deterioration of antenna performance. For example, inclusion of a shielding member has a limitation on preventing/reducing deterioration of antenna reception sensitivity when generating the maximum Tx power at the antenna.

SUMMARY

Embodiments of the disclosure provide a ground connecting structure for reducing deterioration of sensitivity of an antenna disposed adjacent to the display due to an influence by the noise (e.g., RF noise) from the display drive IC (DDI) in a device performing communication (e.g., radio frequency (RF) communication) with an external electronic device.

According to various example embodiments of the disclosure, there may be provided an electronic device comprising: a housing, a display, a ground sheet disposed on a rear surface of the display, a substrate disposed in an inner space of the housing, an antenna disposed on one side of the housing, and a flexible sheet including a display drive IC configured to control the display disposed thereon, wherein an opening through the flexible sheet is provided in an area between the display drive IC and the antenna, wherein a conductive member comprising a conductive material is disposed in the opening, and wherein noise induced at the antenna is reduced based on the conductive member being electrically connected to the ground sheet.

According to various example embodiments, there may be provided an electronic device comprising: a housing including a metal frame, a display, a ground sheet disposed on a rear surface of the display, a substrate disposed in an inner space of the housing, an antenna configured to perform communication with another electronic device using the metal frame, a flexible sheet including a display drive IC configured to control the display disposed thereon, and a shielding sheet configured to shield noise of the display drive IC, wherein an opening through the flexible sheet and the shielding sheet is provided in an area between the display drive IC and the antenna, wherein a conductive member comprising a conductive material is included and is disposed through the opening and spaced apart from the display drive IC by a specified interval in a first direction, and wherein the conductive member is connected to the ground sheet on one surface and is stacked with a conductive island formed in the housing along a second direction perpendicular to the first direction, on another surface.

According to various example embodiments, there may be provided an electronic device comprising: a housing, a display, a ground sheet disposed on a rear surface of the display, a substrate disposed in an inner space of the housing, an antenna disposed on at least one side of the housing, and a flexible sheet having a display drive IC configured to control the display disposed thereon, wherein the flexible sheet forms a first grounding point through an electrical connection with the substrate, and wherein noise induced at the antenna is reduced by forming a second grounding point through a conductive member comprising a conductive material disposed in an area between the display drive IC and the antenna and connected to the ground sheet on one surface and stacked with a conductive island formed in the housing on another surface.

In an electronic device according to various example embodiments of the disclosure, it is possible to prevent and/or reduce deterioration of antenna sensitivity by reducing the Tx power reinduced at the antenna through the DDI.

Various example embodiments of the disclosure may advantageously reduce deterioration of antenna performance caused by the display in line with the development trend of lightweight, thin, and compact electronic devices.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
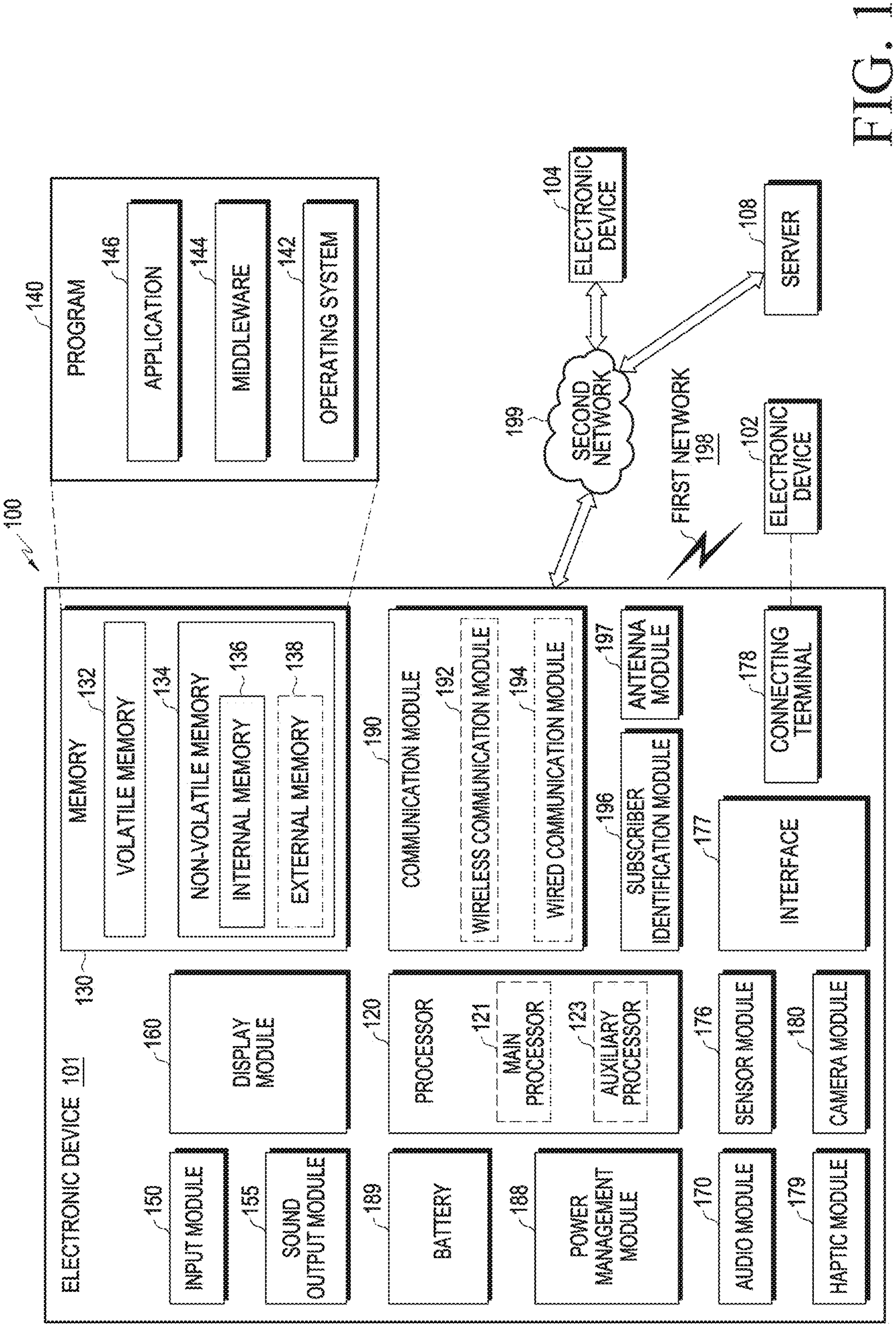
FIG. 1 is a block diagram illustrating an example electronic device according to various embodiments.

Various example embodiments are provided for one of ordinary skill in the art to easily understand the technical scope of the disclosure and the present disclosure is not limited thereto. The accompanying drawings are provided to easily describe the embodiments of the disclosure and may differ from actual implementations. Before describing in detail various example embodiments of the disclosure, it should be noted that applications of the present disclosure are not limited to the configuration and arrangements of the components described and shown in connection with the drawings. When a component is "connected to" or "coupled to" another component, the component may be directly connected or coupled to the other component, or other component(s) may intervene therebetween. The term "connection" may refer to all physical or electrical connections, such as attachment, coupling, joining, or combining, as well as a direct or indirect connection between one member and another.

The terms as used herein are provided merely to describe various embodiments thereof, but not to limit the present disclosure. As used herein, the singular forms "a," "an," and "the" are intended to include the plural forms as well, unless the context clearly indicates otherwise. It will be further understood that the terms "comprise" and/or "have," when used in this disclosure, specify the presence of stated features, integers, steps, operations, elements, and/or components, but do not preclude the presence or addition of one or more other features, integers, steps, operations, elements, components, and/or groups thereof.

In the following detailed description, a length direction, a width direction, and/or a height direction (or thickness direction) of the electronic device may be mentioned and may be referred to as a 'Y-axis direction,' 'X-axis direction', and/or 'Z-axis direction,' respectively. In an embodiment, 'negative/positive (−/+)' may be mentioned together with the Cartesian coordinate system illustrated in the drawings with respect to the direction in which the component is oriented. For example, the front surface of the electronic device or housing may be referred to as a 'surface facing in the −Z direction,' and the rear surface may be referred to as a 'surface facing in the +Z direction'. In an embodiment, the side surface of the electronic device or housing may include a surface facing in the +X direction, a surface facing in the +Y direction, a surface facing in the −X direction, and/or a surface facing in the −Y direction. In an embodiment, "X-axis direction", "Y-axis direction", and/or "Z-axis direction", respectively, may refer to both the −X direction and the +X direction, both the −Y direction and the +Y direction, and/or both the Z-axis direction and the +Z-axis direction. Further, in the following description, "first direction" may refer to either the X-axis direction or the Y-axis direction, and "second direction" may refer to the Z-axis direction. It should be noted that the directions are so defined with respect to the Cartesian coordinate system shown in the drawings for the sake of brevity of description, and the description of these directions or components do not limit various embodiments of the disclosure.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power protection circuit 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power protection circuit 188 may manage the power supplied to the electronic device 101. According to an embodiment, the power protection circuit 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
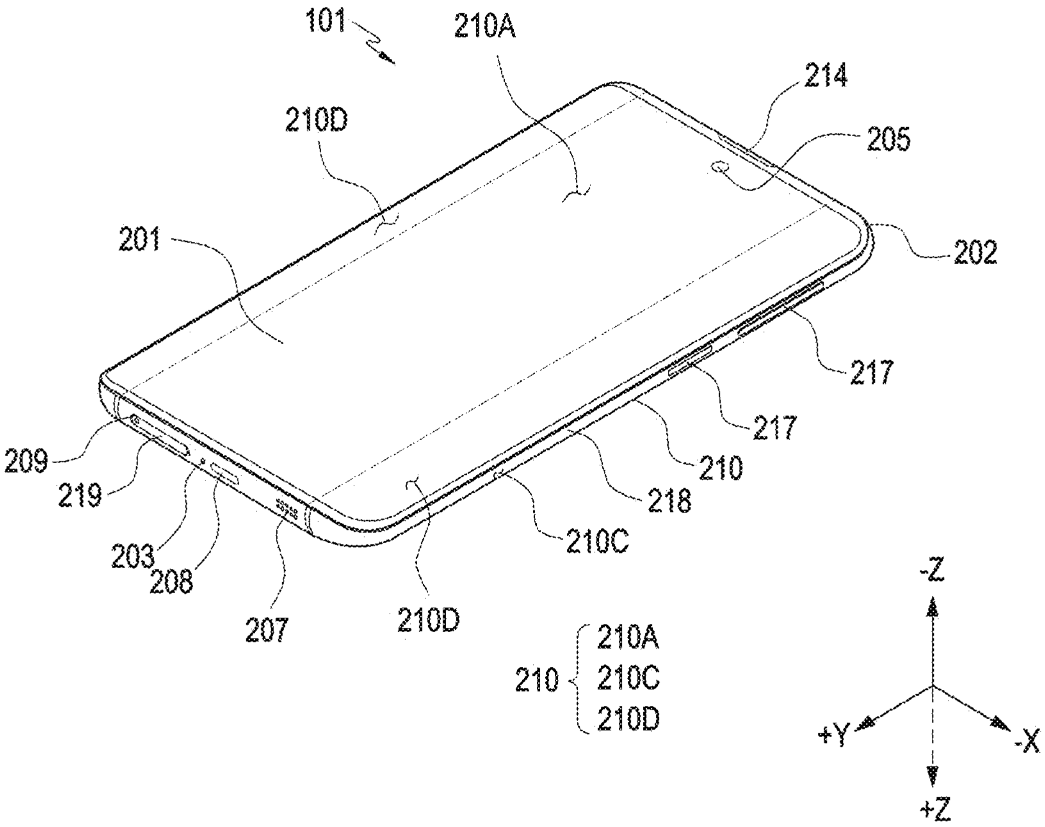
FIG. 2 is a front perspective view illustrating an electronic device according to various embodiments.
Figure 3:
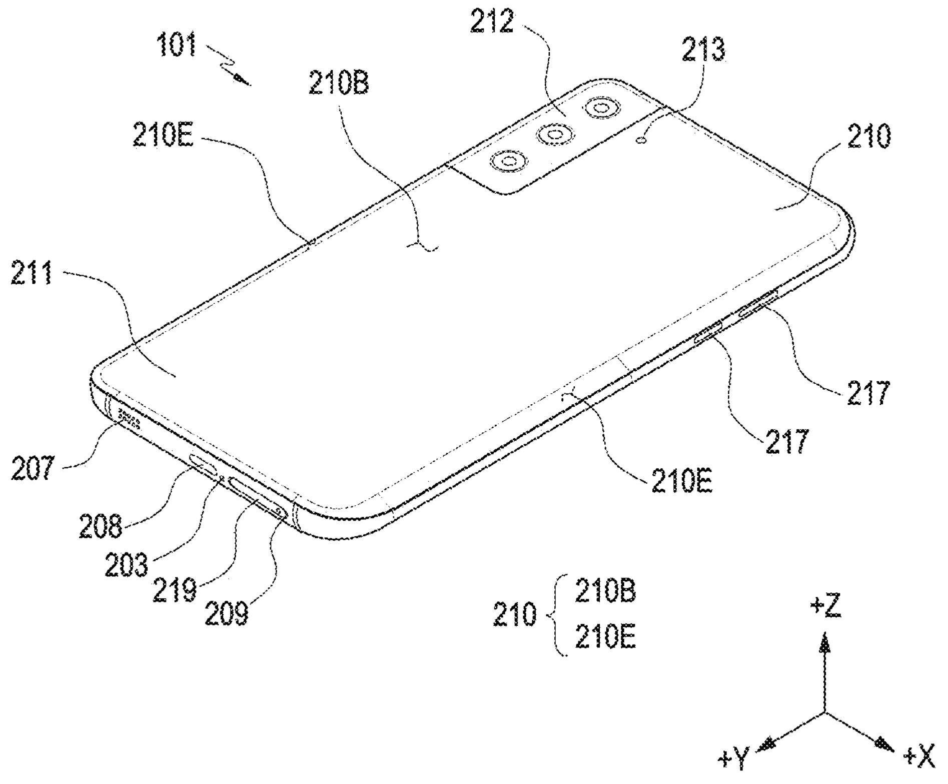
FIG. 3 is a rear perspective view illustrating an electronic device according to various embodiments.

FIG. 2 is a front perspective view illustrating an electronic device 101 according to various embodiments. FIG. 3 is a rear perspective view illustrating an electronic device 101 according to various embodiments.

Referring to FIGS. 2 and 3, according to an embodiment, an electronic device 101 may include a housing 210 with a front surface 210A, a rear surface 210B, and a side surface 210C surrounding a space between the front surface 210A and the rear surface 210B. According to an embodiment (not shown), the housing 210 may denote a structure forming part of the front surface 210A, the rear surface 210B, and the side surface 210C of FIG. 2. According to an embodiment, at least part of the front surface 210A may have a substantially transparent front plate 202 (e.g., a glass plate or polymer plate including various coating layers). The rear surface 210B may be formed by a rear plate 211. The rear plate 211 may be formed of, e.g., glass, ceramic, polymer, metal (e.g., aluminum, stainless steel (STS), or magnesium), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., glass, metal, such as aluminum, or ceramic).

In an embodiment, the front plate 202 may include two first edge areas 210D, which seamlessly and bendingly extend from the first surface 210A to the rear plate 211, on both the long edges of the front plate 202. In the embodiment (refer to FIG. 3) illustrated, the rear plate 211 may include two second edge areas 210E, which seamlessly and bendingly extend from the rear surface 210B to the front plate 202, on both the long edges. According to an embodiment, the front plate 202 (or the rear plate 211) may include only one of the first edge regions 210D (or the second edge regions 210E). According to an embodiment, the first edge regions 210D or the second edge regions 210E may partially be excluded. According to an embodiment, at side view of the electronic device 101, the side bezel structure 218 may have a first thickness (or width) for sides that do not have the first edge areas 210D or the second edge areas 210E and a second thickness, which is smaller than the first thickness, for sides that have the first edge areas 210D or the second edge areas 210E.

According to an embodiment, the electronic device 101 may include at least one of a display 201, audio modules 203, 207, and 214 (e.g., the audio module 170 of FIG. 1), a sensor module (e.g., the sensor module of FIG. 1). 176), camera modules 205, 212, and 213 (e.g., the camera module 180 of FIG. 1), a key input device 217 (e.g., the input module 150 of FIG. 1), a connector hole 208 (e.g., the connecting terminal 178 of FIG. 1), and a tray hole 209. In various embodiments, the electronic device 101 may exclude at least one of the components or may add another component.

According to an embodiment, the display 201 (e.g., the display module 160 of FIG. 1) may be visible through a significant portion of the front plate 202. According to an embodiment, at least a portion of the display 201 may be visible through the front plate 202 forming the front surface 210A and the first edge regions 210D. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment, the surface (or the front plate 202) of the housing 210 may include a screen display area formed as the display 201 is visible. For example, the screen display area may include the front surface 210A and first edge areas 210D.

In an embodiment (not shown), a recess or opening may be formed in a portion of the screen display area (e.g., the front surface 210A or the first edge area 210D) of the display 201, and at least one or more of the audio module 214, sensor module (not shown), light emitting device (not shown), and camera module 205 may be aligned with the recess or opening. According to an embodiment (not shown), at least one or more of the audio module 214, sensor module (not shown), camera module 205, fingerprint sensor (not shown), and light emitting device (not shown) may be included on the rear surface of the screen display area of the display 201.

According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen.

According to an embodiment, at least part of the key input device 217 may be disposed in the first edge regions 210D and/or the second edge regions 210E.

According to an embodiment, the audio modules 203, 207, and 214 may include, e.g., a microphone hole 203 and speaker holes 207 and 214. A microphone for acquiring external sounds may be disposed in the microphone hole 203. In various embodiments, a plurality of microphones may be disposed to detect the direction of the sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers). The audio modules 203, 207, and 214 are not limited to the above-described structure. Depending on the structure of the electronic device 101, various design changes may be made—e.g., only some of the audio modules may be mounted, or a new audio module may be added.

According to an embodiment, the sensor modules (not shown) may generate an electrical signal or data value corresponding to an internal operating state or external environmental state of the electronic device 101. The sensor modules (not shown) may include a first sensor module (not shown) (e.g., a proximity sensor) and/or a second sensor module (not shown) (e.g., a fingerprint sensor) disposed on the front surface 210A of the housing 210 and/or a third sensor module (not shown) (e.g., an HRM sensor) and/or a fourth sensor module (not shown) (e.g., a fingerprint sensor) disposed on the rear surface 210B of the housing 210. In an embodiment (not shown), the fingerprint sensor may be disposed on the rear surface 210B as well as on the front surface 210A (e.g., the display 201) of the housing 210. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown). The sensor module (not shown) is not limited to the above-described structure. Depending on the structure of the electronic device 101, various design changes may be made—e.g., only some of the sensor modules may be mounted, or a new sensor module may be added.

According to an embodiment, the camera modules 205, 212, and 213 may include a first camera module 205 disposed on the first surface 210A of the electronic device 101, and a rear camera device 212 and/or a flash 213 disposed on the rear surface 210B. The camera modules 205 and 212 may include one or more lenses, an image sensor, and/or an image signal processor. The flash 213 may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 101. The camera modules 205, 212, and 213 are not limited to the above-described structure. Depending on the structure of the electronic device 101, various design changes may be made—e.g., only some of the camera modules may be mounted, or a new camera module may be added.

According to an embodiment, the electronic device 101 may include a plurality of camera modules (e.g., a dual camera or triple camera) having different attributes (e.g., angle of view) or functions. For example, a plurality of camera modules 205 and 212 including lenses having different angles of view may be configured, and the electronic device 101 may control to change the angle of view of the camera modules 205 and 212 performed by the electronic device 101 based on the user's selection. At least one of the plurality of camera modules 205 and 212 may form, for example, a wide-angle camera and at least another of the plurality of camera modules may form a telephoto camera. Similarly, at least one (e.g., 205) of the plurality of camera modules 205 and 212 may be a front camera and at least another (e.g., 212) of the plurality of camera modules may be a rear camera. Further, the plurality of camera modules 205 and 212 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module (not shown) for detecting the distance to the subject. According to an embodiment, a portion (e.g., front camera module 205) of the plurality of camera modules 205 and 212 may be implemented as an under display camera (UDC).

According to an embodiment, the key input device 217 may be disposed on the side surface 210C of the housing 210. According to an embodiment, the electronic device 101 may exclude all or some of the above-mentioned key input devices 217 and the excluded key input devices 217 may be implemented in other forms, e.g., as soft keys, on the display 201. According to an embodiment, the key input device may include the sensor module (not shown) disposed on the rear surface 210B of the housing 210.

According to an embodiment, the light emitting device may be disposed on, e.g., the front surface 210A of the housing 210. The light emitting device (not illustrated) may provide, e.g., information about the state of the electronic device 101 in the form of light. According to an embodiment, the light emitting device (not shown) may provide a light source that interacts with, e.g., the front camera module 205. The light emitting device (not illustrated) may include, e.g., a light emitting diode (LED), an infrared (IR) LED, and/or a xenon lamp.

According to an embodiment, the connector hole 208 may include a first connector hole 208 for receiving a connector (e.g., a universal serial bus (USB) connector) for transmitting or receiving power and/or data to/from an external electronic device and may further include a second connector hole (e.g., an earphone jack) (not shown) for receiving a connector for transmitting or receiving audio signals to/from the external electronic device. The connector hole 208 is not limited to the above-described structure. Depending on the structure of the electronic device 101, various design changes may be made, such as mounting only some of the connector holes or adding a new connector hole.

According to an embodiment, the tray hole 209 may be a component for receiving, e.g., a tray 219 for mounting a storage medium. The storage medium that may be mounted in the tray hole 209 may include at least one of a user identification module card (subscriber identification module (SIM) card) and a secure digital (SD) card. The tray hole 209 is illustrated as formed in the bottom surface of the housing 210 in FIGS. 2 and 3, but alternatively, it may be formed in a side or top surface of the housing 210, and its position may vary depending on the purpose and function of the electronic device 101 and various design formfactors.

According to an embodiment, the camera module 205 and/or the sensor module (not shown) may be disposed to contact the external environment through a designated area of the display 201 and the front plate 202 from the internal space of the electronic device 101. For example, the designated area may be an area in which pixels are not disposed in the display 201. As another example, the designated area may be an area in which pixels are disposed in the display 201. When viewed from above the display 201, at least a portion of the designated area may overlap the camera module 205 and/or the sensor module. As another example, some sensor modules may be arranged to perform their functions without being visually exposed through the front plate 202 from the internal space of the electronic device.

Figure 4:
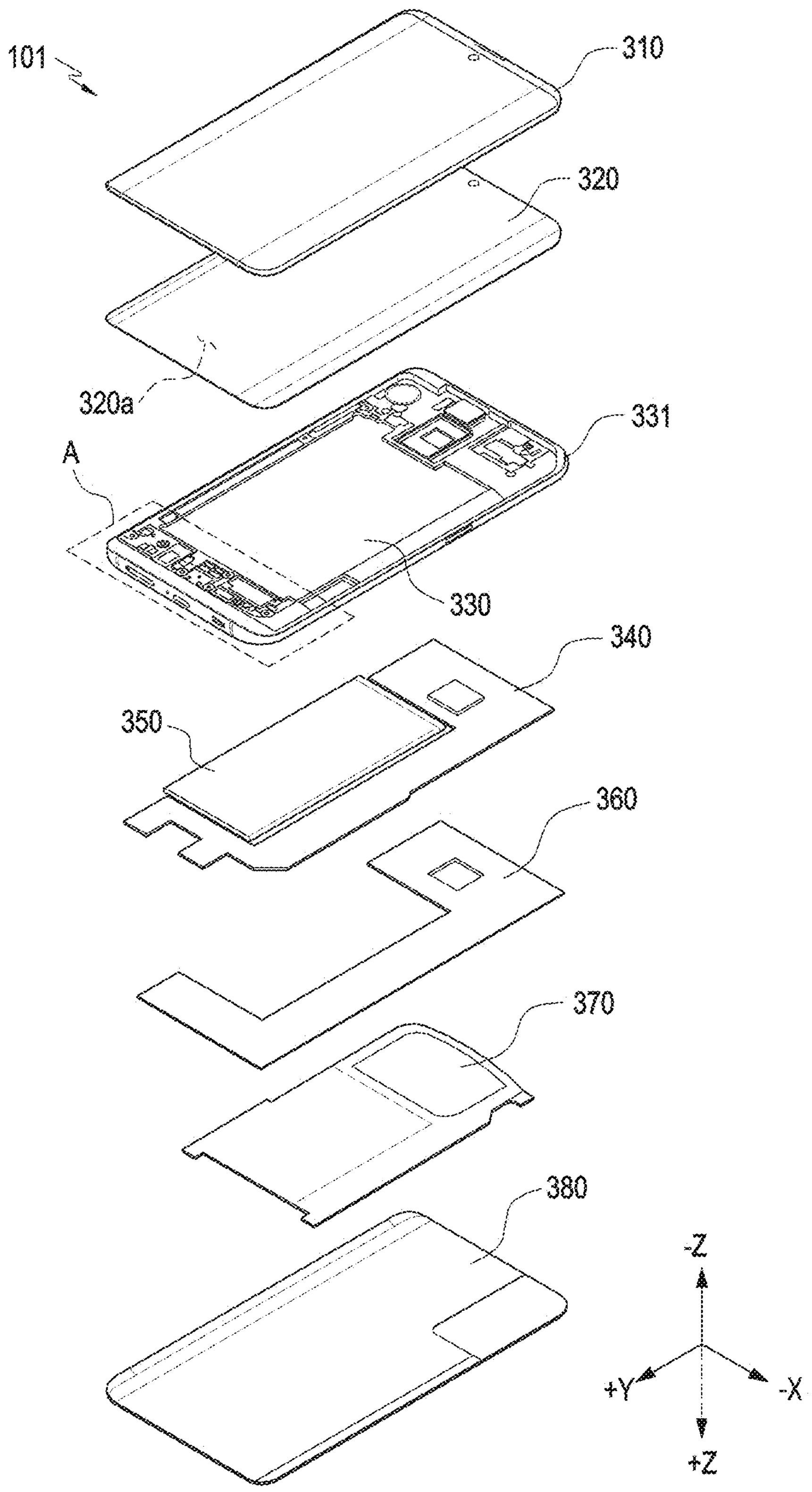
FIG. 4 is an exploded perspective view illustrating an electronic device according to various embodiments.

FIG. 4 is an exploded perspective view illustrating an electronic device according to various embodiments.

Referring to FIG. 4, an electronic device 101 (e.g., the electronic device 101 of FIGS. 2 and 3) may include a front plate 310 (e.g., the front plate 202 of FIG. 2), a display 320 (e.g., the display 201 of FIG. 2), a supporting member 330 (e.g., a front case), a printed circuit board 340 (e.g., a PCB, a flexible PCB, or a rigid flexible PCB (RFPCB)), a battery 350, a second supporting member 360 (e.g., a rear case), an antenna 370, and a rear plate 380 (e.g., the rear plate 211 of FIG. 3). According to an embodiment, the electronic device 101 may exclude at least one (e.g., the supporting member 330 or the second supporting member 360) of the components or may add other components. At least one of the components of the electronic device 101 may be the same or similar to at least one of the components of the electronic device 101 of FIG. 2 or 3 and no duplicate description is made below.

According to an embodiment, the supporting member 330 may be a component that is disposed inside the electronic device 101 to support other components or structures in the electronic device and may be connected with the side bezel structure 331 or integrated with the side bezel structure 331. The supporting member 330 may be formed of, e.g., a metal and/or non-metallic material (e.g., polymer). The display 320 may be joined onto one surface of the supporting member 330, and the printed circuit board 340 may be joined onto the opposite surface of the supporting member 274.

A processor, memory, and/or interface may be mounted on the printed circuit board 340. The processor may include one or more of, e.g., a central processing unit, an application processor, a graphic processing device, an image signal processing, a sensor hub processor, or a communication processor. According to an embodiment, the printed circuit board 340 may include a flexible printed circuit board type radio frequency cable (FRC). For example, the printed circuit board 340 may be disposed on at least a portion of the supporting member 330 and may be electrically connected with an antenna module (e.g., the antenna module 197 of FIG. 1) and a communication module (e.g., the communication module 190 of FIG. 1). The supporting member 330 may also be referred to as a first supporting member 330 to be distinguished from the second supporting member 360, which is described below. According to an embodiment, the memory may include, e.g., a volatile or non-volatile memory. According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 350 may be a device for supplying power to at least one component of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to various embodiments, the second supporting member 360 (e.g., a rear case) may be disposed between the printed circuit board 340 and the antenna 370. For example, the second supporting member 360 may include one surface to which at least one of the printed circuit board 340 and the battery 350 is coupled, and another surface to which the antenna 370 is coupled.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. For example, the antenna 370 may include a coil for wireless charging. According to an embodiment of the present disclosure, an antenna structure may be formed by a portion or combination of the side bezel structure 331 and/or the first supporting member 330.

According to various embodiments, the rear plate 380 may form at least a portion of the rear surface (e.g., the rear surface 310B of FIG. 3) of the electronic device 101.

The electronic device 101 disclosed in FIGS. 2, 3 and 4 has a bar-type or plate-type appearance but the disclosure is not limited thereto. For example, the illustrated electronic device may be part of a rollable electronic device or a foldable electronic device. "Rollable electronic device" may refer, for example, to an electronic device at least a portion of which may be wound or rolled or received in the housing 210 as the display may be bent and deformed. As the display is stretched out or is made visible to the outside in a larger area according to the user's need, the rollable electronic device may use an expanded second display area. "Foldable electronic device" may refer, for example, to an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In various embodiments, according to various embodiments of the disclosure, the electronic device 101 may be understood as including various electronic devices, such as a laptop computer or a home appliance, as well as a portable electronic device, such as a smart phone.

Referring back to FIG. 4, an electronic device 101 including the display 320 may include a display drive IC (hereinafter, abbreviated as "DDI") (hereinafter, the DDI 321 of FIG. 5 described below). According to an embodiment, the DDI 321 may be disposed on a flexible sheet (hereinafter, the flexible sheet 322 of FIG. 5 described below).

A ground connecting structure in which an antenna disposed adjacent to the display 320 is affected by noise (e.g., RF noise) caused by the DDI 321 to reduce deterioration in the electronic device 101 performing communication (e.g., the second network communication 199 of FIG. 1) with an external electronic device (e.g., the external electronic device 102 or 104 or the server 108 of FIG. 1) is described in greater detail below with reference to FIGS. 5 to 19. In the following description, the DDI 321 is illustrated as being disposed adjacent to a lower end (e.g., portion A of FIG. 4) of the electronic device 101, but it should be noted that the position of the DDI 321 is not necessarily limited thereto. For example, the DDI 321 may be disposed adjacent to an upper end of the electronic device 101 or a side surface of the electronic device 101. For example, a ground connecting structure for reducing deterioration of antenna sensitivity due to an influence of noise (e.g., RF noise) by the DDI 321 based on an example in which the DDI 321 is disposed adjacent to a lower end (e.g., portion A of FIG. 4) of the electronic device 101 may be described below. These descriptions may also be applied to an embodiment in which the DDI 321 is disposed adjacent to an upper end of the electronic device 101 or a side surface of the electronic device 101.

Figure 5:
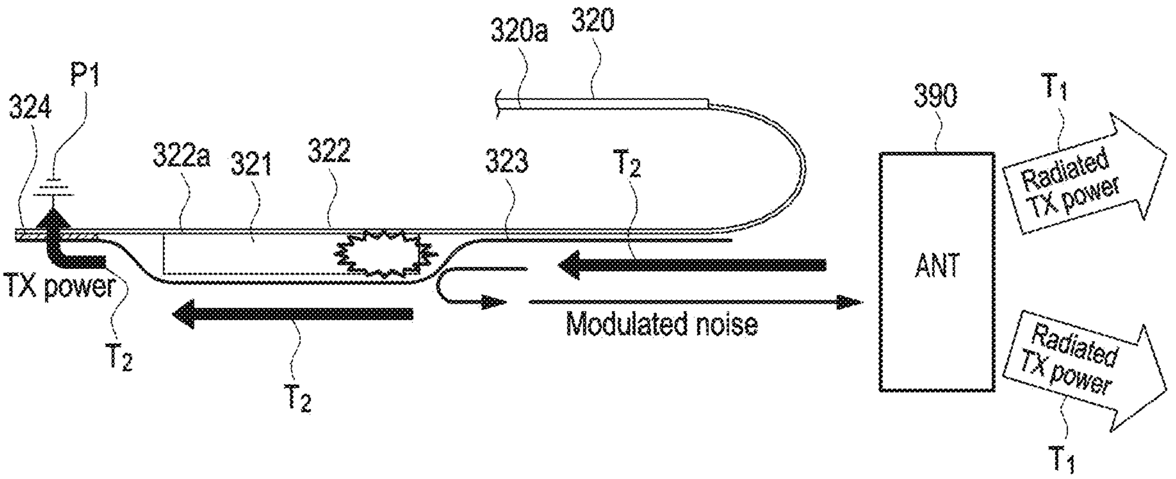
FIG. 5 is a diagram illustrating a state in which the sensitivity of an antenna is deteriorated due to an influence of noise (e.g., RF noise) by a display drive IC (DDI) according to a comparative embodiment.
Figure 6:
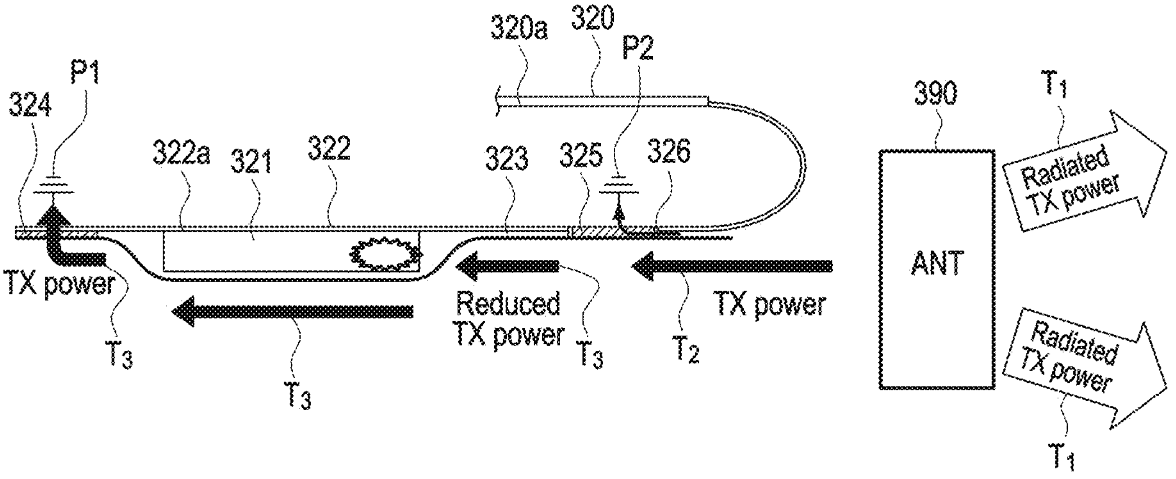
FIG. 6 is a diagram illustrating a state in which deterioration of antenna sensitivity is reduced when a ground connecting structure is included according to various embodiments.

FIG. 5 is a diagram illustrating a state in which the sensitivity of an antenna is deteriorated due to an influence of noise (e.g., RF noise) by a display drive IC (DDI) according to an comparative embodiment. FIG. 6 is a diagram illustrating a state in which deterioration of antenna sensitivity is reduced when a ground connecting structure is included according to various embodiments.

An electronic device (e.g., the electronic device 101 of FIGS. 1 to 4) according to the embodiments of FIGS. 5 and 6 may include a housing (e.g., the housing 210 of FIGS. 2 and 3), a display 320 (e.g., the display 201 of FIGS. 2 and 3 or the display 320 of FIG. 4), and a DDI 321 for controlling the display 320.

According to various embodiments, the DDI 321 may be connected to a display (e.g., the display 320 of FIG. 4) in a chip on film (COF), chip on pane (COP), or chip on glass (COG) manner. For example, referring to FIG. 5, in a chip on film (COF) manner, it is illustrated that the DDI 321 is disposed on one surface 322*a* of the flexible sheet 322, and the flexible sheet 322 has one portion connected to the display 320 and another portion connected to a printed circuit board (PCB) 324 (hereinafter, simply referred to as a substrate 324). In this case, the substrate 324 may be disposed on the rear surface of the display 320.

The electronic device 101 may have an antenna 390 disposed adjacent to the display 320 and the DDI 321. According to an embodiment, the antenna 390 may be an antenna for communicating with another electronic device (e.g., the external electronic devices 102 and 104 or the server 108 of FIG. 1) using at least a portion of a conductive portion (e.g., a metal frame) of the housing. For example, the antenna 390 may be an antenna for performing cellular communication (e.g., 2G, 3G, 4G, LTE, 5G, mm Wave, 60 GHz, or WiGig communication), short-range communication (e.g., Wi-Fi, Bluetooth, or NFC), and/or global navigation satellite system (GNSS).

According to an embodiment, the antenna 390 may be disposed at a position different from that of the antenna 370 described above in FIG. 4, e.g., on a side surface of the housing. The side surface of the housing may be formed of a metal material and/or a non-metal (e.g., polymer) material. The side surface of the metal housing may be utilized as an antenna.

In an electronic device (e.g., the electronic device 101 of FIGS. 1 to 4) having such a structure, when the display is powered on, noise may be induced at the antenna 390 by the DDI 321, and thus antenna performance may be deteriorated. For example, as illustrated in FIG. 5, when the antenna 390 transmits a signal, the antenna 390 may generate Tx power T2 radiated to the inside of the electronic device together with Tx power T1 radiated to the outside. The Tx power T2 radiated to the inside of the electronic device may flow through the DDI 321 to a grounding point (the first grounding point P1) connected to the substrate 324. When Tx power is maximally generated at the antenna 390, the Tx power T2 may be induced in the DDI 321, and the induced Tx power T2 and DDI low frequency noise may be modulated with each other. Further, as the modulated noise is reinduced into the antenna 390, the reception (Rx) sensitivity of the antenna 390 may be significantly reduced.

According to various embodiments, the electronic device (e.g., the electronic device 101 of FIGS. 1 to 4) may further include a DDI shielding sheet 323 in the form of a film or tape to shield between the DDI 321 and an antenna in order to prevent and/or reduce DDI low-frequency noise from occurring. However, even when the DDI shielding sheet 323 is applied, DDI low-frequency noise generation is not completely prevented, and there is also a limitation in reducing antenna performance deterioration. For example, the maximum Tx power may be generated at the antenna 390, and it may be difficult to prevent or reduce the decrease in the reception sensitivity of the antenna merely by having the DDI shielding sheet 323.

According to various embodiments of the disclosure, it is possible to provide a ground connecting structure for preventing and/or reducing a decrease in reception sensitivity of the antenna 390 in the comparative embodiment of FIG. 5. The electronic device (e.g., the electronic device 101 of FIGS. 1 to 4) according to various embodiments of the disclosure may include an opening 326 formed through the flexible sheet 322 and the DDI shielding sheet 323 in an area between the DDI 321 and the antenna 390 and a grounding conductive member 325 disposed in the opening, as the ground connecting structure as shown in FIG. 6.

Referring to FIG. 6, when the antenna 390 transmits a signal to an external electronic device, the antenna 390 may generate Tx power T2 radiated to the inside of the electronic device together with Tx power T1 radiated to the outside. In the embodiment illustrated in FIG. 6, as the grounding conductive member 325 is disposed in the area between the DDI 321 and the antenna 390, a portion of the Tx power T2 radiated to the inside of the electronic device may flow to the grounding point (second grounding point P2) connected through the conductive member 325, so that Tx power T3 which is reduced as compared with the Tx power T2 initially radiated may flow through the DDI 321 to the grounding point (first grounding point P1) connected with the substrate 324. Accordingly, even when the Tx power T3 induced at the DDI 321 and the DDI low frequency noise are modulated with each other, the modulated noise induced again to the antenna 390 may be smaller than in the comparative embodiment illustrated in FIG. 5.

In summary, the electronic device (e.g., the electronic device 101 of FIGS. 1 to 4) according to various embodiments of the disclosure may have the second grounding point P2 formed through the conductive member 325 disposed in the area between the DDI 321 and the antenna 390 as well as the first grounding point P1 of the flexible sheet 322 electrically connected with the substrate 324, thereby reducing the modulated noise reinduced to the antenna 390. Accordingly, the reception (Rx) sensitivity of the antenna 390 in the embodiment illustrated in FIG. 6 may be enhanced compared to the comparative embodiment illustrated in FIG. 5.

The position of the opening 326 in which the conductive member 325 is disposed is described in greater detail below with reference to FIGS. 7 and 8.

Figure 7:
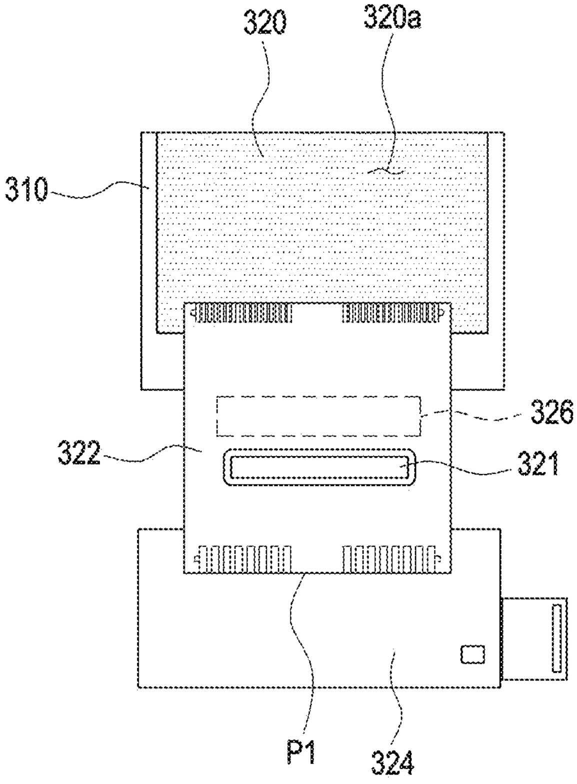
FIG. 7 is a diagram illustrating a rear view of a state in which a flexible sheet and a display drive IC are stretched out, according to various embodiments.

FIG. 7 is a diagram illustrating rear view of a state in which a flexible sheet and a display drive IC are stretched out, according to various embodiments. FIG. 8 is a diagram illustrating side view of a state in which a flexible sheet and a display drive IC are stretched out, according to various embodiments.

Figure 8:
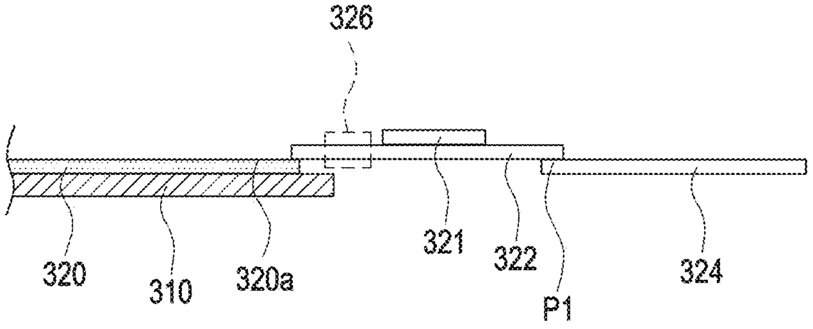
FIG. 8 is a diagram illustrating a side view of a state in which a flexible sheet and a display drive IC are stretched out, according to various embodiments.

FIGS. 7 and 8 are views for helping understanding of the DDI 321 disposed in a chip on film (COF) manner. Unlike FIG. 6 in which the flexible sheet 322 is bent with respect to the display 320, FIGS. 7 and 8 may show that the flexible sheet 322 is not bent with respect to the display 320 but is stretched out flat between the display 320 and the substrate 324.

According to various embodiments, the flexible sheet 322 may be formed of one of a flexible printed circuit board (flexible PCB (FPCB) or rigid flexible PCB (RFPCB)) or a flexible film or a combination of the flexible printed circuit board and the flexible film.

According to various embodiments, one end of the flexible sheet 322 may be connected to one side of the display 320, and the other end may be connected to the substrate 324. The DDI 321 may be disposed on one surface 322*a* of the flexible sheet 322. In the embodiment of FIG. 6, the flexible sheet 322 is bent with respect to the display 320, and the position of the opening 326 in which the grounding conductive member (e.g., the grounding conductive member 325 of FIG. 6) is disposed may be formed in an area between the DDI 321 and the antenna 390. In the embodiments of FIGS. 7 and 8, a state in which the flexible sheet 322 is stretched out flat with respect to the display 320 is illustrated. In this case, the position of the opening 326 in which the grounding conductive member (e.g., the grounding conductive member 325 of FIG. 6) is disposed may be formed in the area between the display 320 and the DDI 321. Referring to FIGS. 6 to 8 together, the bent state as in the embodiment shown in FIG. 6 may be implemented by bending the flexible sheet 322 to allow the substrate 324 to be positioned on the rear surface 320*a* of the display 320 in a state in which one end of the flexible sheet 322 is fixed to the substrate 324. Using the flexible sheet 322, it is possible to move the position of the DDI 321 for the control operation of the display 320 toward the rear surface 320*a* of the display 320, to enlarge the size area of the display 320, and to shrink the bezel, which is the inactive area. The bending of the flexible sheet 322 may be performed at a portion adjacent to the side surface (or the side surface of the housing) of the electronic device, and the DDI 321 may be disposed at a position adjacent to the side surface (or the side surface of the housing) of the electronic device.

Hereinafter, various ground connecting structures of the disclosure are described in greater detail with reference to FIGS. 9 to 15.

Figure 9:
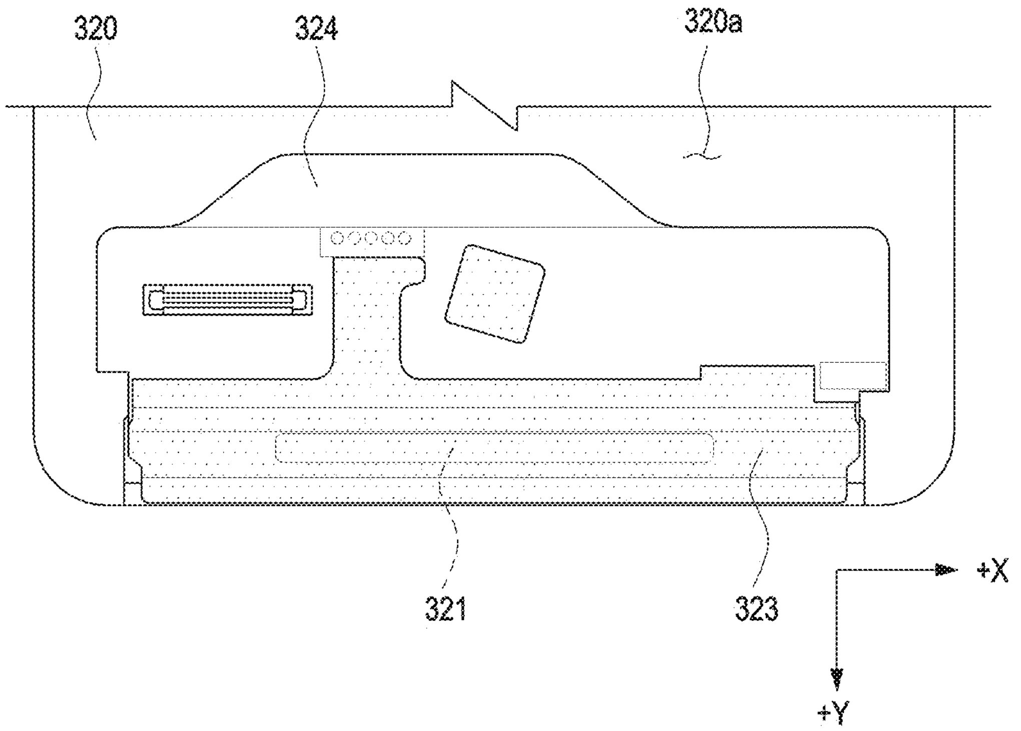
FIG. 9 is a diagram illustrating rear view of a display having a display drive IC shielding sheet according to various embodiments.
Figure 10:
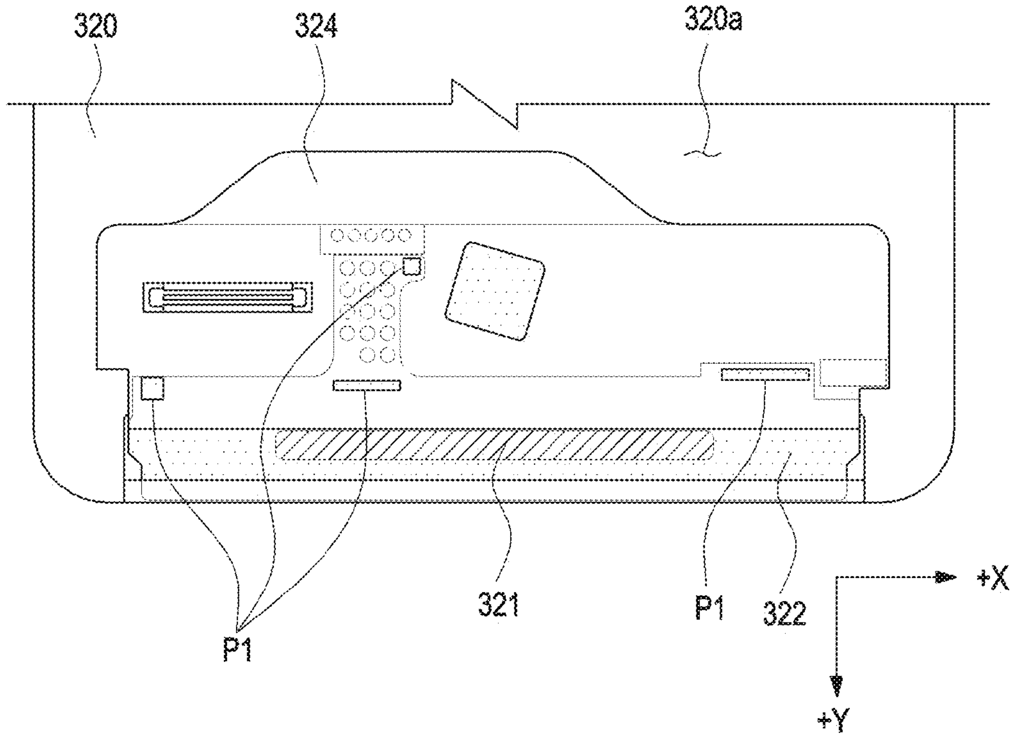
FIG. 10 is a diagram illustrating a first grounding point on a rear surface of a display according to various embodiments.

FIG. 9 is a diagram illustrating a rear view of a display having a display drive IC shielding sheet according to various embodiments. FIG. 10 is a diagram illustrating a first grounding point on a rear surface of a display according to various embodiments. FIGS. 9 and 10 are enlarged views illustrating part A of FIG. 4.

According to various embodiments, the substrate 324 may be disposed on the rear surface 320*a* of the display 320, and the position thereof may be fixed on the rear surface 320*a* of the display 320. Corresponding thereto, a portion of the flexible sheet 322 in a bent state may be disposed on the rear surface 320*a* of the display 320. The DDI 321 may be disposed on one surface of the flexible sheet 322. As illustrated in FIGS. 9 and 10, the flexible sheet 322 may have a structure that is bent at an edge of the display 320, e.g., a position adjacent to a side surface of the electronic device (e.g., a lower portion end of the electronic device).

Referring to FIG. 9, when the rear surface 320*a* of the display 320 is viewed, the DDI shielding sheet 323 may be stacked with the flexible sheet 322 to cover the flexible sheet 322. In the embodiment illustrated in FIG. 10, the DDI shielding sheet 323 is omitted in FIG. 9, and one end of the flexible sheet 322 is connected to the substrate 324. The other end of the flexible sheet 322 may be connected to the rear surface 320*a* of the display 320, although not shown in the drawings.

According to various embodiments, a grounding point (the first grounding point P1) for grounding Tx power passing through the DDI 321 may be formed on the substrate 324. Since the flexible sheet 322 has small rigidity and has a structure that is bent at a position adjacent to the side surface of the electronic device, it may be difficult to form a grounding point in the structure. Accordingly, according to various embodiments, as a grounding point for grounding Tx power, the first grounding point P1 may be formed on the substrate 324. According to various embodiments, a plurality of first grounding points P1 may be provided on the substrate 324, and may be formed at various positions on the substrate 324. In this case, the first grounding point P1 may be formed at a position farther from the side surface (e.g., the side surface positioned in the +Y direction) of the electronic device than the position where the DDI 321 is disposed. Since the first grounding point P1 is formed at a position farther from the side surface of the electronic device than the position where the DDI 321 is disposed, when Max Tx power is generated at the antenna 390, the Tx power T2 may be induced at the DDI 321, and it may be difficult to prevent or reduce reinduction to the antenna 390 of the modulated noise of the induced Tx power T2 and the DDI low-frequency noise.

Accordingly, the electronic device (e.g., the electronic device 101 of FIGS. 1 to 4) according to various embodiments of the disclosure may provide another grounding point (second grounding point P2) formed between the DDI 321 and the side bezel structure (or antenna disposed on the side surface of the electronic device) of the electronic device and provided separately from the first grounding point P1.

Hereinafter, another grounding point (the second grounding point P2) is described in greater detail with reference to FIGS. 11 to 14.

First, the opening is described in greater detail with reference to FIG. 11.

Figure 11:
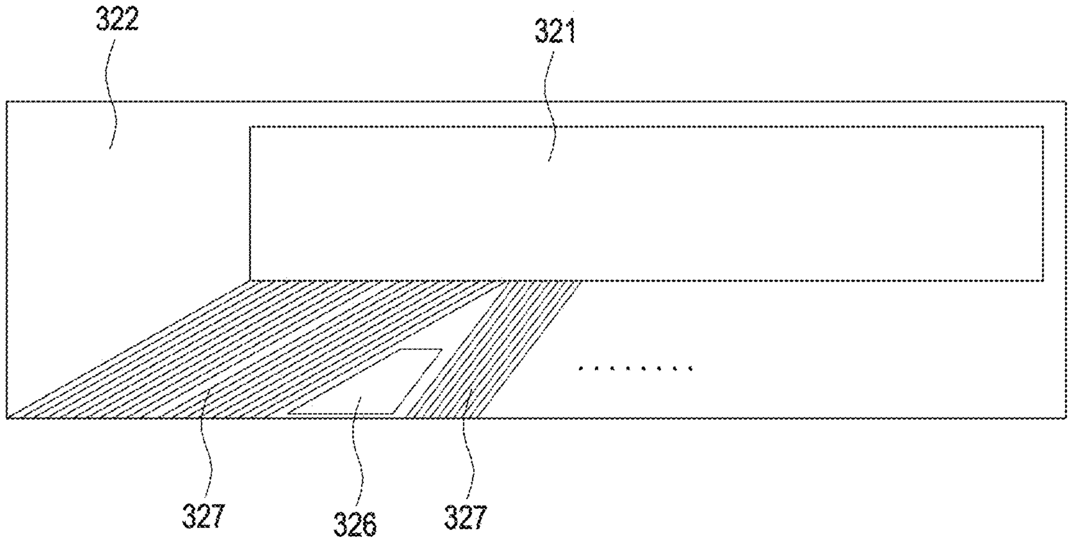
FIG. 11 is a diagram illustrating a flexible sheet having an opening according to various embodiments.

FIG. 11 is a diagram illustrating a flexible sheet having an opening according to various embodiments.

According to various embodiments, the flexible sheet 322 may include a plurality of conductive lines 327. According to various embodiments, the plurality of conductive lines 327 may be signal lines provided to electrically connect the DDI 321 and the display 320. The plurality of conductive lines 327 may be connected to the DDI 321 disposed on the flexible sheet 322, and the plurality of conductive lines 327 may stay bundled.

According to various embodiments, the opening 326 formed in the flexible sheet 322 may be formed not to overlap the plurality of conductive lines 327. For example, the plurality of conductive lines 327 may be designed to avoid the opening 326.

According to various embodiments, the opening 326 may be formed in various shapes such as a circular shape, an oval shape, or a rectangular shape. However, according to an embodiment, considering that the conductive lines 327 extend from the DDI 321 to the display 320, the opening 326 may be formed in a trapezoidal shape with a short top or a triangular shape with a vertex facing the DDI 321. FIG. 11 illustrates, as an example, a trapezoidal opening 326 having a short top surface.

Figure 12A:
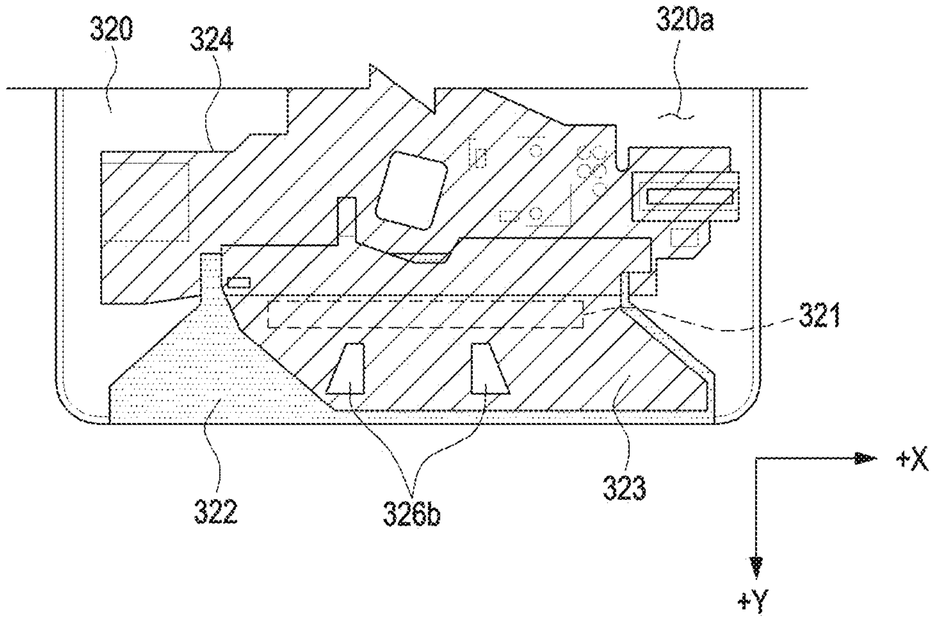
FIG. 12A is a diagram illustrating a display drive IC shielding sheet having an opening according to various embodiments.

Although only one opening 326 is illustrated in FIG. 11, two openings 326 are illustrated in FIG. 12A and the subsequent drawings, and a plurality of openings 326 not illustrated in the drawings may be provided.

Figure 12B:
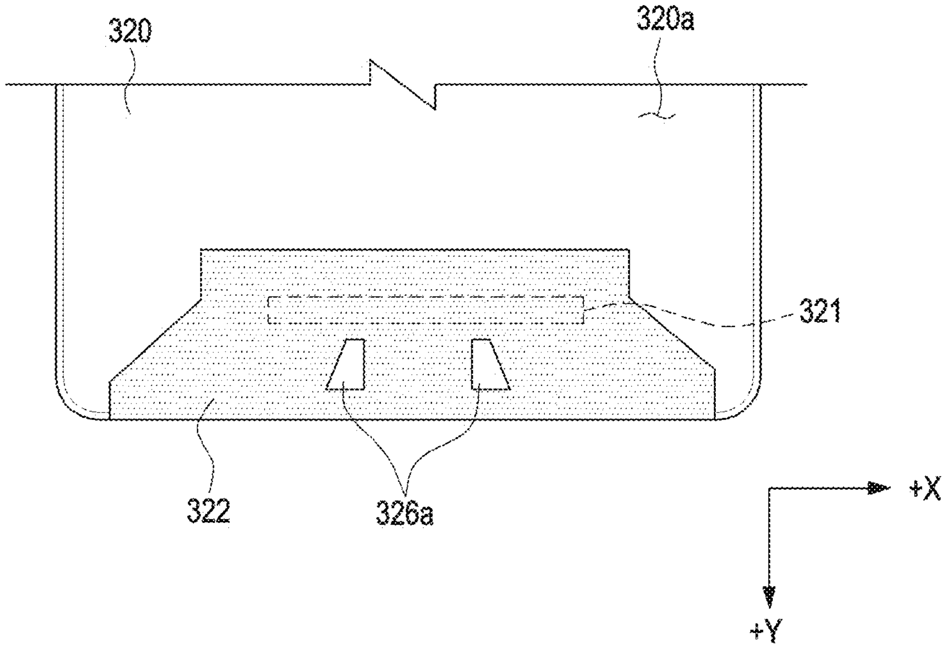
FIG. 12B is a diagram illustrating a display drive IC shielding sheet having an opening according to various embodiments.
Figure 12C:
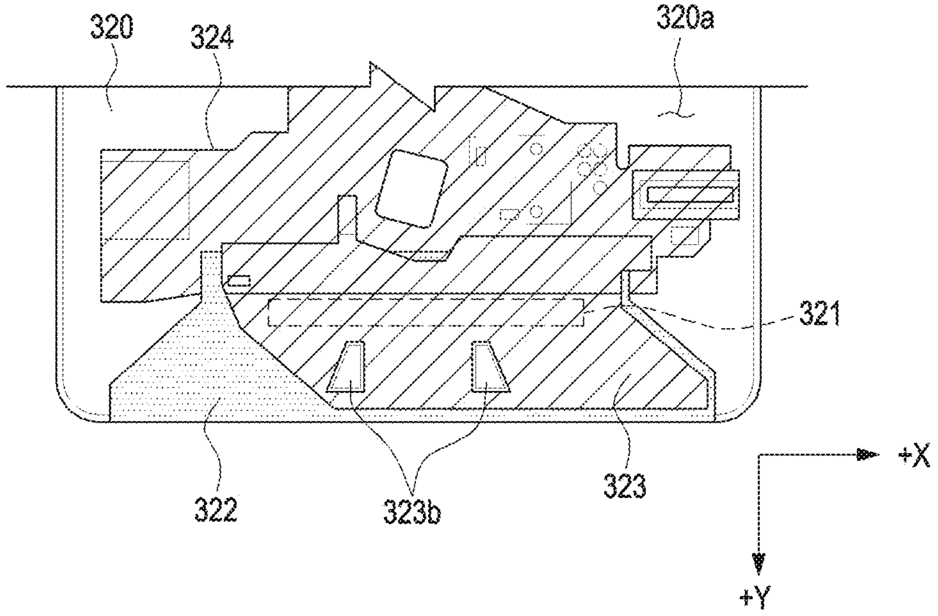
FIG. 12C is a diagram illustrating a display drive IC shielding sheet in a state in which a conductive member is formed in an opening according to various embodiments.
Figure 12D:
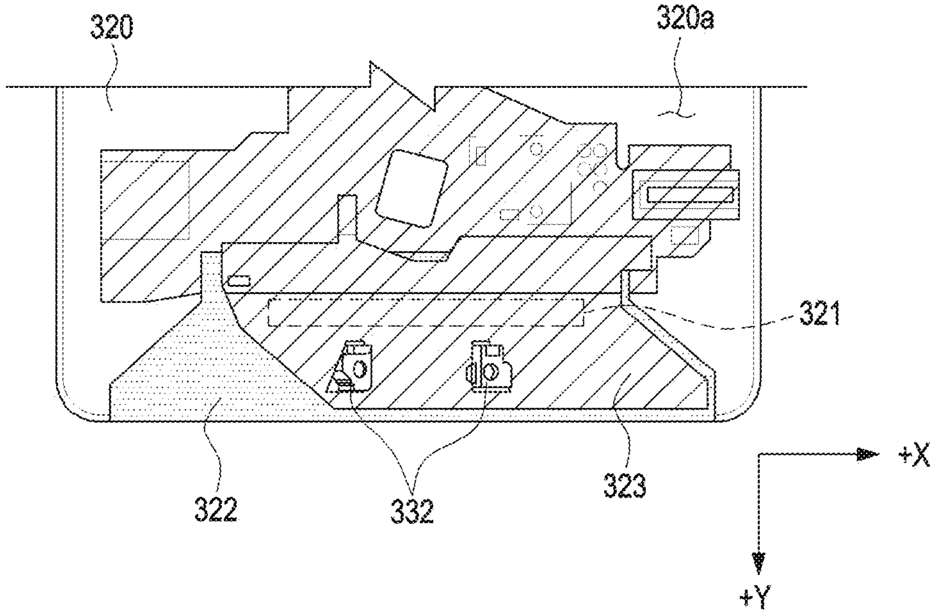
FIG. 12D is a diagram illustrating a state in which a conductive island is disposed at a position corresponding to the conductive member according to various embodiments.

FIG. 12A is a diagram illustrating a display drive IC shielding sheet having an opening according to various embodiments. FIG. 12B is a diagram illustrating a display drive IC shielding sheet having an opening according to various embodiments. FIG. 12C is a diagram illustrating a display drive IC shielding sheet in a state in which a conductive member is formed in an opening according to various embodiments. FIG. 12D is a diagram illustrating a state in which a conductive island is disposed at a position corresponding to the conductive member according to various embodiments.

A DDI shielding sheet 323 is provided to prevent and/or reduce noise from being induced at the antenna due to a close arrangement between the DDI 321 and the antenna (e.g., the antenna disposed at the lower end of the electronic device), and may include a kind of shielding tape. Referring to FIG. 12A, the DDI shielding sheet 323 may be disposed to cover a substantial portion of the flexible sheet 322 on which the substrate 324 and the DDI 321 are disposed.

A ground sheet (the ground sheet 328 of FIG. 17 described below) may be disposed on the rear surface 320*a* of the display 320. The ground sheet may be stacked on the rear surface 320*a* of the display 320.

Referring to FIGS. 12A and 12B together, since the DDI shielding sheet 323 is formed to cover the flexible sheet 322, an opening 326 for disposing a grounding conductive member (e.g., the grounding conductive member 325 of FIG. 6) may also be formed in the DDI shielding sheet 323. Hereinafter, to be distinguished from the opening 326 formed in the flexible sheet 322, the opening formed in the flexible sheet 322 may be referred to as a first opening 326*a*, and the opening formed in the DDI shielding sheet 323 may be referred to as a second opening 326*b*. In this case, the first opening 326*a* formed in the flexible sheet 322 may be formed at a position corresponding to the second opening 326*b* formed in the DDI shielding sheet 323.

Referring to FIG. 12C, the grounding conductive member 325 may be disposed through the openings (the first opening 326*a* and the second opening 326*b*). According to various embodiments of the disclosure, by disposing the conductive member 325, an additional grounding path may be formed between the DDI 321 and a side surface (or an antenna disposed adjacent to the side surface) of the electronic device.

According to various embodiments, the conductive member 325 may include an elastic material such as sponge, foam, or poron, or may include a c-clip. Using a material having an elastic material as the conductive member 325, the pressure applied to the display 320 may be reduced, preventing/reducing damage to the display 320.

Referring to FIGS. 12C and 12D together, the conductive member 325 may be disposed at a position corresponding to the conductive island 332 disposed in the housing. According to an embodiment, the conductive island 332 may be a portion fixedly disposed to a supporting member inside the housing, and may include, e.g., a metal material. According to an embodiment, the conductive member 325 may be stacked with the conductive island 332 along the height direction of the electronic device. The conductive member 325 may be stacked with the conductive island 332, providing a grounding path from the conductive member 325 to the conductive island 332. According to an embodiment, the conductive island 332 may include a metal bracket for fixing the socket inside the housing. For example, the conductive island 332 may be a metal bracket for screw hole assembly for fixing a connector socket.

Hereinafter, the conductive island 332 is described in greater detail with reference to FIGS. 13 and 15D.

Figure 13:
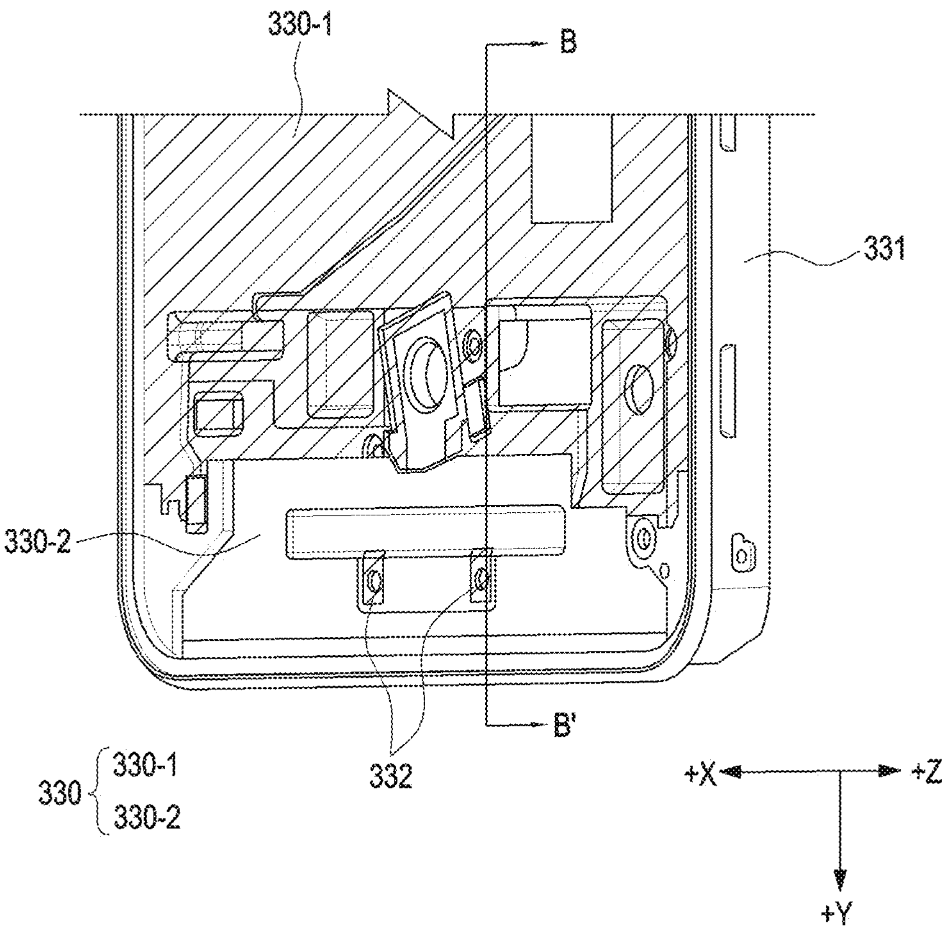
FIG. 13 is a perspective view illustrating a supporting member according to various embodiments.
Figure 14:
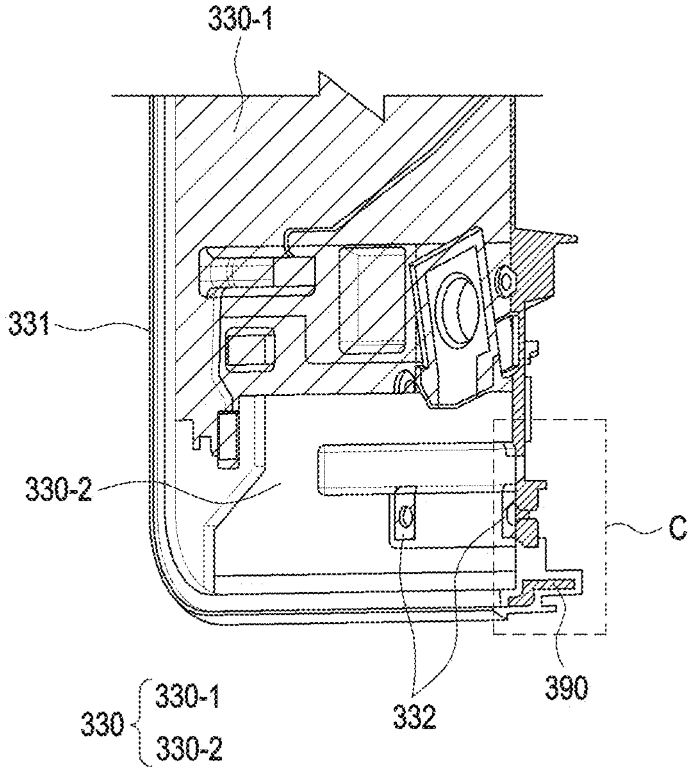
FIG. 14 is a cross-sectional view illustrating the supporting member of FIG. 13, taken along direction B-B' according to various embodiments.

FIG. 13 is a perspective view illustrating a supporting member according to various embodiments. FIG. 14 is a cross-sectional view illustrating the supporting member of FIG. 13, taken along direction B-B' according to various embodiments.

According to various embodiments, the supporting member 330 may be provided to support and/or couple other components (e.g., the display 320, the printed circuit board 340, and/or various electronic components). The supporting member 330 is a material having high rigidity for supporting and/or coupling other components (e.g., the display 320, the printed circuit board 340, and/or various electronic components), and may include, e.g., metal or non-metal (e.g., polymer or polycarbonate (PC)). The supporting member 330 may include one surface 330*a* facing the rear surface (the rear surface 320*a* of FIGS. 12A to 12D) of the display 320. At least a portion of the supporting member 330 may be formed of a conductive portion 330-1 to provide an electrical path, and another portion of the supporting member 330 may be formed of a non-conductive portion 330-2. For example, as illustrated in FIG. 13, a substantial portion of the supporting member 330 may be formed of the conductive portion 330-1 (e.g., the hatched portion of FIG. 13), and a portion adjacent to the side bezel structure 331 may be formed of the non-conductive portion 330-2 (e.g., the non-hatched portion of FIG. 13) to utilize a portion of the side bezel structure 331 as an antenna. For example, FIG. 13 illustrates that a portion adjacent to the lower end of the electronic device is formed of the non-conductive portion 330-2.

Although not shown separately in the drawings, according to various embodiments, a second shielding sheet (not shown) may be formed in the non-conductive portion. The second shielding sheet (not shown) is provided to prevent and/or reduce noise from being induced at the antenna due to mutual influence by the close arrangement between the DDI 321 and the antenna (e.g., the antenna disposed at a lower end of the electronic device) of the electronic device, similarly to the DDI shielding sheet 323 (which may be referred to hereinafter as a first shielding sheet 323 to be distinguished) described above, and may include a kind of shielding tape. As another example, the second shielding sheet (not shown) may be a shielding sheet provided in the supporting member 330, unlike the DDI shielding sheet 323 disposed to cover one surface of the flexible sheet 322.

Referring to FIGS. 13 and 14 together, according to various embodiments, a conductive island 332 for forming a grounding point (the second grounding point P2) may be disposed in the non-conductive portion 330-2 adjacent to the lower end of the electronic device. In the conductive island 332, non-conductive materials may be formed around a corresponding component, and the corresponding component itself may include a material (e.g., metal) for forming an electrical path. Referring to the cross section of the supporting member 330 illustrated in FIG. 14, the conductive island 332 may be present at a position spaced apart from the conductive portion 330 and the side surface (or the antenna 390 positioned on the side surface of the electronic device) of the electronic device. For example, the conductive island 332 may be formed at a position surrounded by the non-conductive portion between the antenna 390 positioned in the side bezel structure 331 and the conductive portion 330-1 of the supporting member 330.

As described above, it should be noted that the description of the position of the conductive island 332 is intended to help understanding, and is not intended as limited to any particular embodiment. For example, the conductive island 332 forming the grounding point may not be limited as being disposed at a position adjacent to the lower end of the electronic device. Various positions of the conductive island 332 which forms the grounding point may be set corresponding to various positions of the DDI 321 disposed in the electronic device.

Figure 15A:
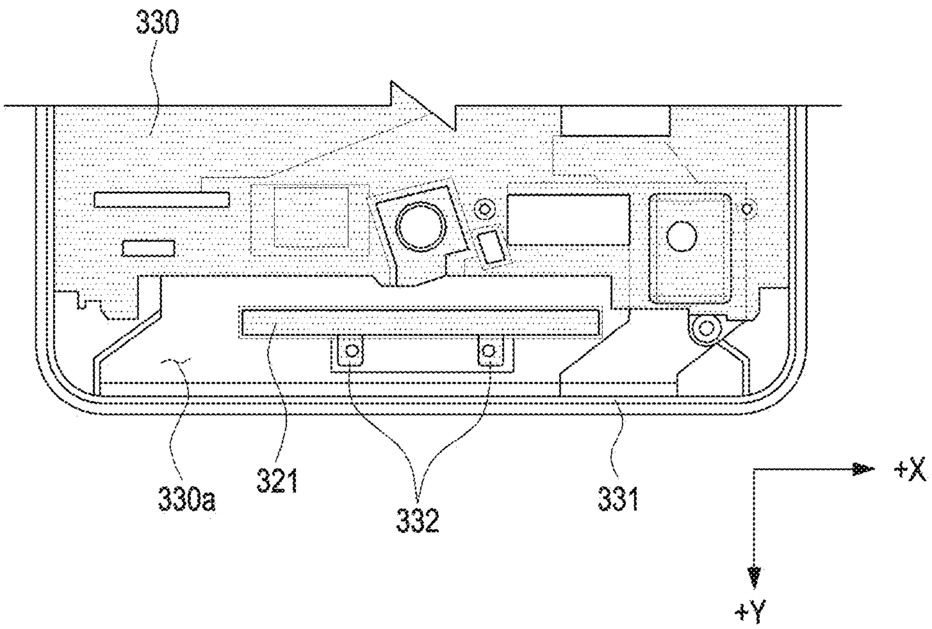
FIG. 15A is a diagram illustrating a state in which a conductive island is disposed on a supporting member according to various embodiments.
Figure 15B:
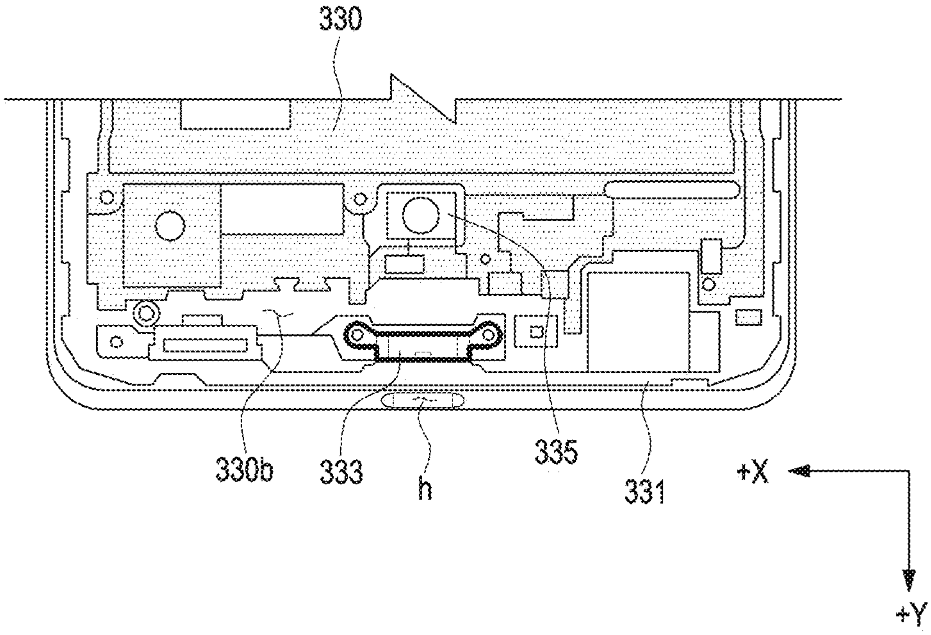
FIG. 15B is a diagram illustrating a state in which a socket is disposed on a supporting member according to various embodiments.
Figure 15C:
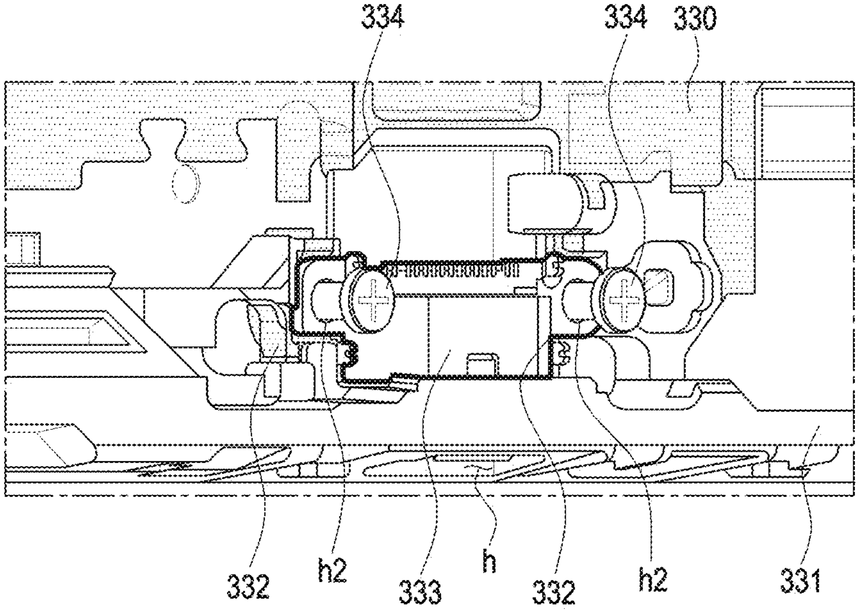
FIG. 15C is a diagram illustrating a state in which a coupling member is coupled to a socket according to various embodiments.

FIG. 15A is a diagram illustrating a state in which a conductive island is disposed on a supporting member according to various embodiments. FIG. 15B is a diagram illustrating a state in which a socket is disposed on a supporting member according to various embodiments. FIG. 15C is a diagram illustrating a state in which a coupling member is coupled to a socket according to various embodiments.

FIG. 15A illustrates one surface 330*a* of the supporting member 330 of FIGS. 13 and 14 viewed from above the display of the electronic device. Referring to FIG. 15A, the conductive island 332 may be positioned between the DDI 321 and the side bezel structure 331. FIG. 15B illustrates another surface 330*b* of the supporting member 330. For example, FIG. 15A illustrates the front surface of the supporting member 330, and FIG. 15B illustrates the rear surface of the supporting member 330. In addition to the display 320 or the printed circuit board (e.g., the substrate 324) being coupled to the supporting member 330, various electronic components such as the socket 333 and the fingerprint recognition sensor 335 may be disposed on the supporting member 330.

According to various embodiments, the position of the conductive island 332 may correspond to the position of the socket 333 coupled to the supporting member 330. Referring to FIGS. 15A and 15B together, it may be identified that the conductive island 332 is disposed at a position corresponding to the socket 333 coupled to the supporting member 330. The socket 333 may be, e.g., a socket to which a connector (e.g., a USB connector) for transmitting and receiving power and/or data to and from an external electronic device is connected, and may be formed at a position corresponding to a connector hole h (e.g., the first connector hole 208 of FIG. 2) capable of receiving the connector (e.g., the USB connector).

Referring to FIG. 15C, the conductive island 332 may correspond to a metal bracket for assembling the screw 334 for fixing the socket 333 inside the housing. According to an embodiment, the conductive island 332 is a portion fixedly disposed to the supporting member 330, and a screw hole h2 for assembling the screw 334 may be formed. The socket 333 may be fixedly disposed by tightening the screw 334 while being received in the screw hole h2 after placing the socket 333 at a designated position.

However, the socket 333 may not be limited to any specific type. For example, the tray hole 209 illustrated in FIGS. 2 and 3 and the corresponding socket for receiving the SD card tray may also correspond to the socket 333 of the present disclosure. Various positions and shapes may be applied to the conductive island 332, corresponding to the position and shape of the socket 333.

Hereinafter, an electronic device adopting a ground connecting structure according to various embodiments of the disclosure is described in greater detail with reference to FIGS. 16 to 19, based primarily on the arrangement relationship between the components of the electronic device.

Figure 16:
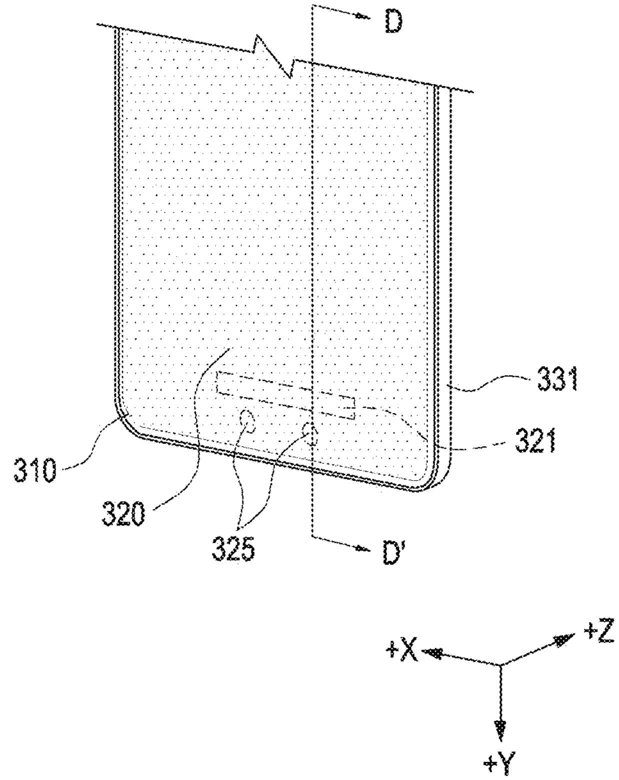
FIG. 16 is a perspective view illustrating an electronic device according to various embodiments.
Figure 17:
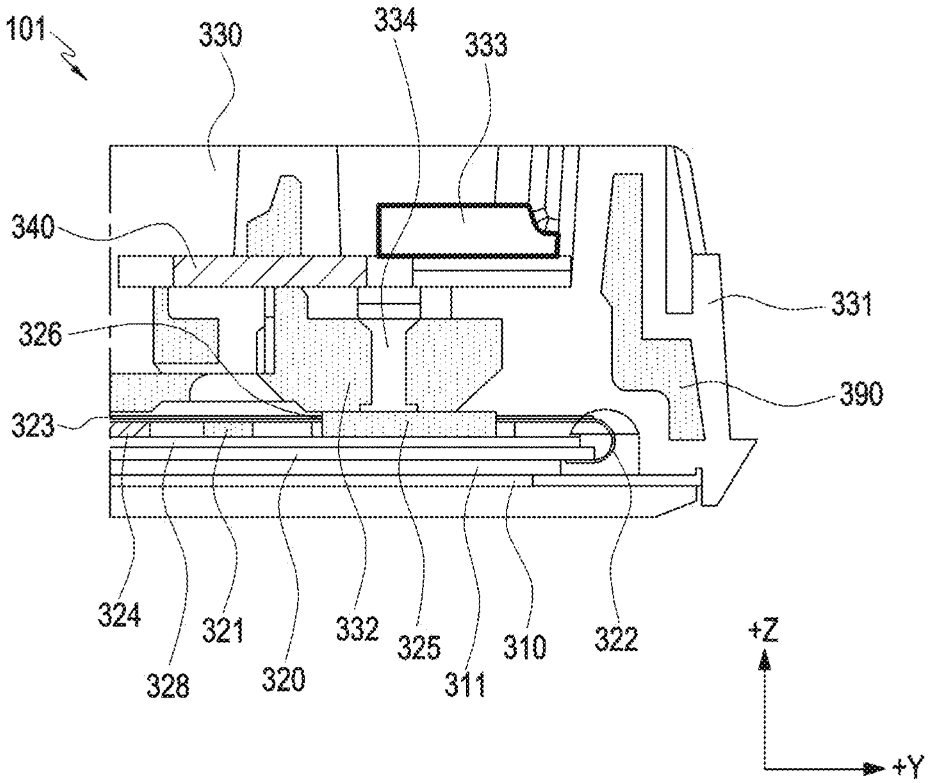
FIG. 17 is a partial cross-sectional view illustrating an electronic device including a ground connecting structure according to various embodiments.
Figure 18:
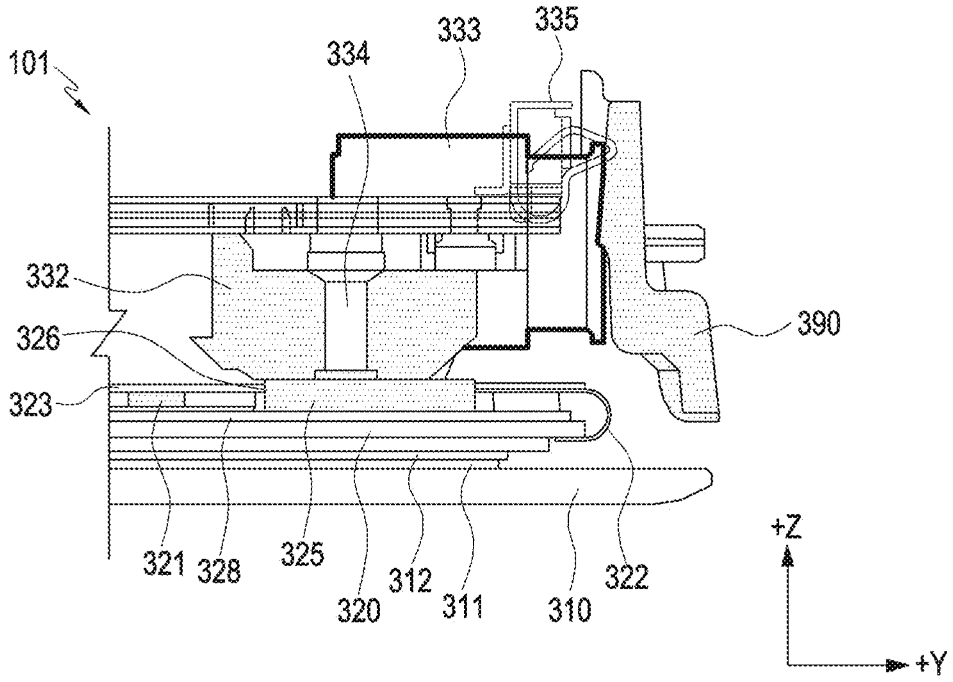
FIG. 18 is a partial cross-sectional view illustrating an electronic device including a ground connecting structure according to various embodiments.

FIG. 16 is a perspective view illustrating an electronic device according to various embodiments. FIG. 17 is a cross-sectional view illustrating an electronic device including a ground connecting structure according to various embodiments. FIG. 18 is a cross-sectional view illustrating an electronic device including a ground connecting structure according to various embodiments.

FIG. 16 is a view illustrating an electronic device 101 including a housing (e.g., the housing 210 of FIGS. 2 and 3) and a display 320 according to various embodiments, and FIGS. 17 and 18 are views illustrating a portion of a cross section of the electronic device 101 of FIG. 16, taken along direction D-D' with respect to the conductive member 325. FIG. 18 illustrates that various components (e.g., the second substrate 340) including the supporting member 330 are omitted from FIG. 17.

Referring to FIG. 16, the electronic device 101 may include a housing (e.g., the housing 210 of FIGS. 2 and 3) and a display 320. The display 320 may be visible to the outside through another portion (e.g., the front plate 310) of the housing while being surrounded by a portion (e.g., the side bezel structure 331) of the housing. For example, the display 320 may be disposed on the rear surface of the front plate 310, and may display a screen to the outside of the electronic device through the substantially transparent front plate 310.

In the electronic device 101 according to various embodiments of the disclosure, at least a portion of the side bezel structure 331 of the housing may be formed of a conductive portion (e.g., a metal frame). In an embodiment, the conductive portion (e.g., a metal frame) may be utilized as an antenna. Further, the electronic device 101 may include the DDI 321 disposed on the rear surface of the display 320, and may include the conductive member 325 for forming a grounding point between the DDI 321 and the side bezel structure 331 of the housing (or the antenna 390 disposed on the side surface of the housing).

Referring to FIGS. 17 and 18, according to various embodiments, the display 320 may form a stacked structure with various layers adjacent thereto. For example, a plurality of layers such as an adhesive layer 311 or a polarization layer 312 may be disposed between the display 320 and the front plate 310, and a ground sheet 328 may be disposed on another surface of the display 320. The plurality of layers may be stacked together with the display 320 in the height direction (e.g., the Z-axis direction) of the electronic device 101. According to various embodiments, the ground sheet 328 may be a component disposed on the rear surface of the display 320 and may provide a ground area on the rear surface of the display 320.

The electronic device 101 may further include various substrates 324 and 340 in the inner space of the housing. For example, various electronic components or various components such as the connector 336 may be disposed on the substrates 324 and 340. According to various embodiments, through a certain substrate 324, the flexible sheet 322 may be supported, or a grounding point (e.g., the first grounding point P1 of FIG. 5) may be provided.

At least a portion of the flexible sheet 322 may be bent at a position adjacent to one side (e.g., the side bezel structure 331) of the housing. The DDI 321 may be disposed on a flat surface of the flexible sheet 322, and the DDI 321 and the flat surfaces around the DDI 321 may be covered by the DDI shielding sheet 323. Further, an opening 326 may be formed through the flexible sheet 322 in an area between the DDI 321 and the side bezel structure 331 (or the antenna 390) of the housing. According to an embodiment, the opening 326 may be formed to penetrate the flexible sheet 322 and the DDI shielding sheet 323 covering the flat surface of the flexible sheet 322.

According to various embodiments, the conductive member 325 may be disposed in the opening 326. According to an embodiment, the conductive member 325 may be disposed at a position spaced apart from the DDI 321 by a predetermined interval in the length direction (the first direction (Y-axis direction)) of the electronic device. As the conductive member 325 is disposed in the opening 326 and one surface is electrically connected to the ground sheet 328, a grounding point (e.g., the second grounding point P2 of FIG. 6) for reducing noise induced at the antenna 390 may be formed.

According to various embodiments, one surface of the conductive member 325 may contact the ground sheet 328, and the other surface of the conductive member 325 may contact the conductive island 332 provided in the supporting member 330. According to an embodiment, the conductive member 325 may be stacked together with the conductive island 332 along the height direction (the second direction (the Z-axis direction)) of the electronic device 101. For example, the conductive island 332 may be a metal bracket for assembling the screw 334 for fixing the socket 333 inside the housing. In an embodiment, the conductive member 325 may include an elastic material, and thus, as the screw 334 for fixing the socket 333 is tightened inside the housing, the conductive member 325 may maintain a stable contact point without being damaged even when a predetermined amount of pressing is applied.

Figure 19:
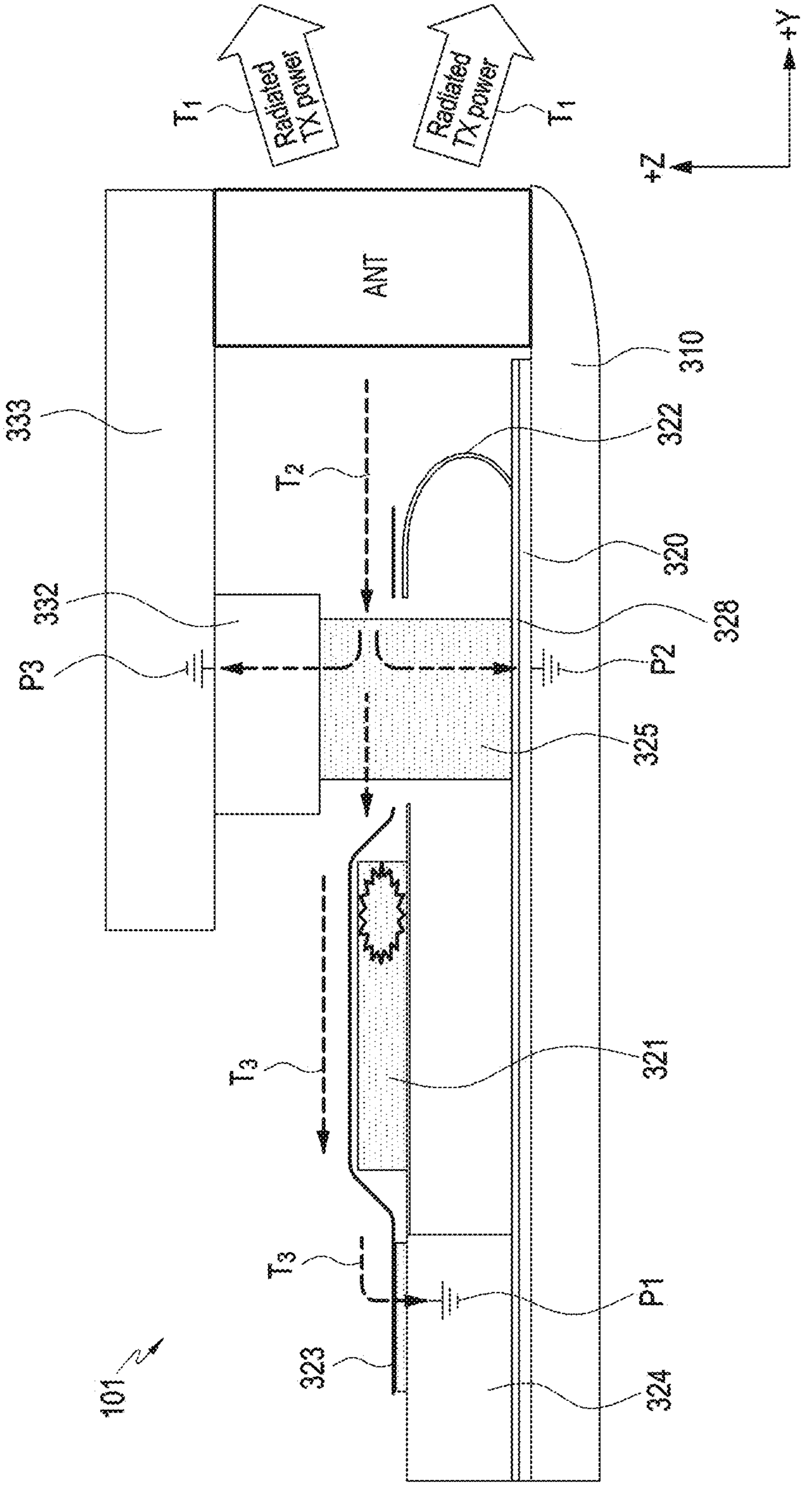
FIG. 19 is a diagram illustrating an electronic device including a ground connecting structure according to various embodiments.

FIG. 19 is a diagram illustrating an electronic device including a ground connecting structure according to various embodiments.

FIG. 19 is a view schematically illustrating main components in the electronic device 101 of FIGS. 16 to 18.

Referring to FIG. 19, the electronic device 101 may have a first grounding point P1 of the flexible sheet 322 electrically connected to the substrate 324, and may additionally form a second grounding point P2 through the conductive member 325 disposed in an area between the DDI 321 and the antenna 390. Further, a third grounding point P3 may be formed through the socket 333 and the conductive island 332 stacked with the conductive member 325. As such, the electronic device 101 according to various embodiments of the disclosure may not only form a grounding point (the first grounding point P1) at a position farther than the DDI 321 with respect to the side surface of the electronic device (or the antenna 390 disposed on the side surface of the electronic device), but also form an additional grounding point (the second grounding point P2 and/or the third grounding point P3) at a position closer to the DDI 321, thereby reducing the modulated noise reinduced to the antenna 390.

Figure 20A:
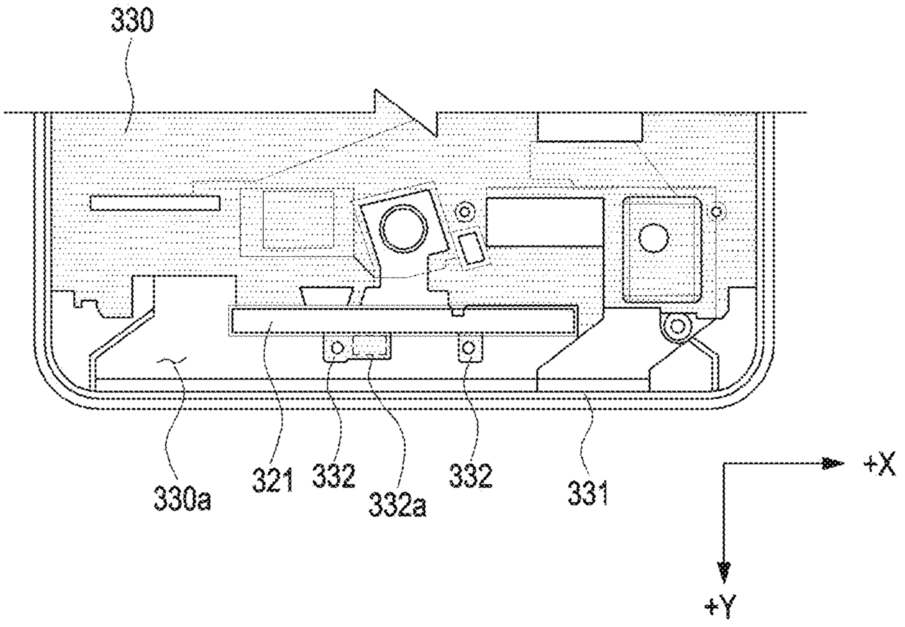
FIG. 20A is a diagram illustrating an enlarged shape of a conductive island according to various embodiments.
Figure 20B:
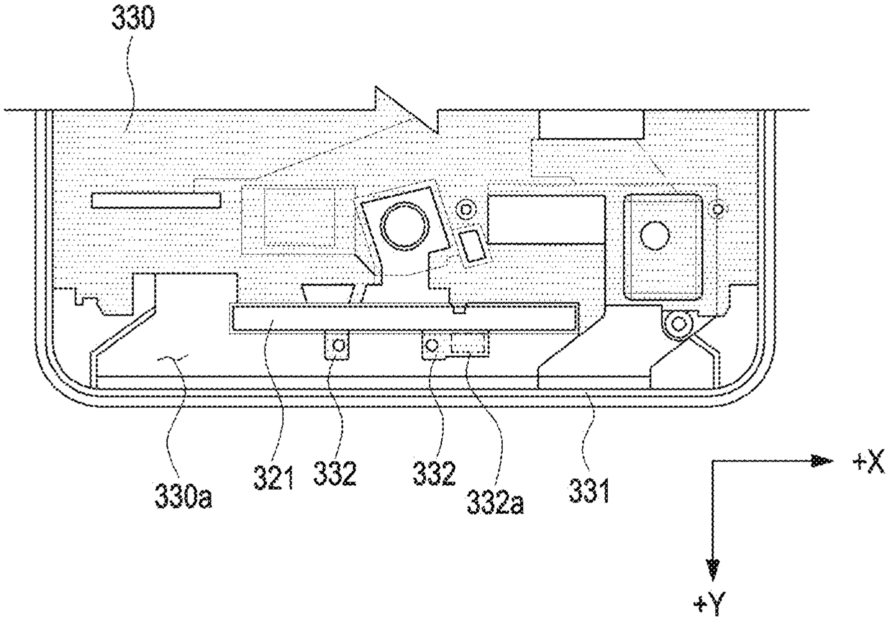
FIG. 20B is a diagram illustrating an enlarged shape of a conductive island according to various embodiments.
Figure 20C:
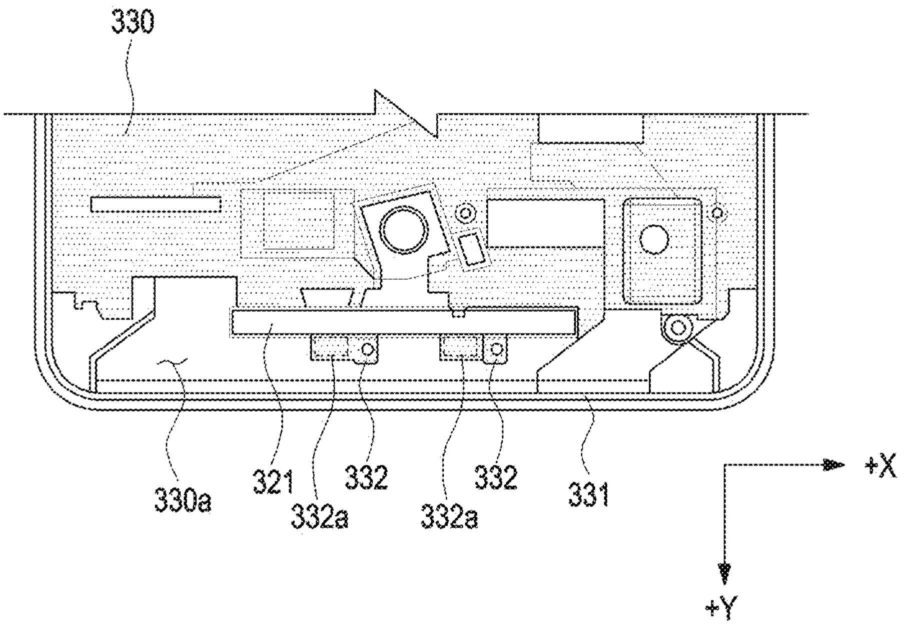
FIG. 20C is a diagram illustrating an enlarged shape of a conductive island according to various embodiments.

FIG. 20A is a diagram illustrating an enlarged shape of a conductive island 332 according to various embodiments. FIG. 20B is a diagram illustrating an enlarged shape of a conductive island 332 according to various embodiments. FIG. 20C is a diagram illustrating an enlarged shape of a conductive island 332 according to various embodiments.

The conductive island 332 may be a portion fixedly disposed on the supporting member 330, and may be a portion in which a screw hole h2 for assembling a screw (e.g., the screw 334 of FIG. 15C) is formed. As illustrated in FIG. 15A, the conductive island 332 may have only a size sufficient to form the screw hole h2, and an additional grounding point may be formed using the conductive island 332. However, examples of the conductive island 332 may not necessarily be limited thereto.

For example, as illustrated in FIGS. 20A and 20B, the conductive island 332 may include a first extension portion **332*a* formed on one side of any one of the pair of conductive islands 332. As another example, as shown in FIG. 20C, each of the pair of conductive islands 332 may include the first extension portion 332*a* formed on one side thereof. In an embodiment, the screw hole h2 is not formed in the first extension portion 332*a*, and may be provided solely for forming an additional grounding point by being stacked with the conductive member 325. As another example, when the conductive island 332 is a metal bracket for assembling the screw 334 for fixing the socket 333 inside the housing, if the position of the metal bracket and the position of the conductive member 325 do not correspond to each other (e.g., if they are not aligned with each other in the +Z direction), the metal bracket may be modified in design to include the first extension portion 332*a*** to provide a grounding point.

Figure 21:
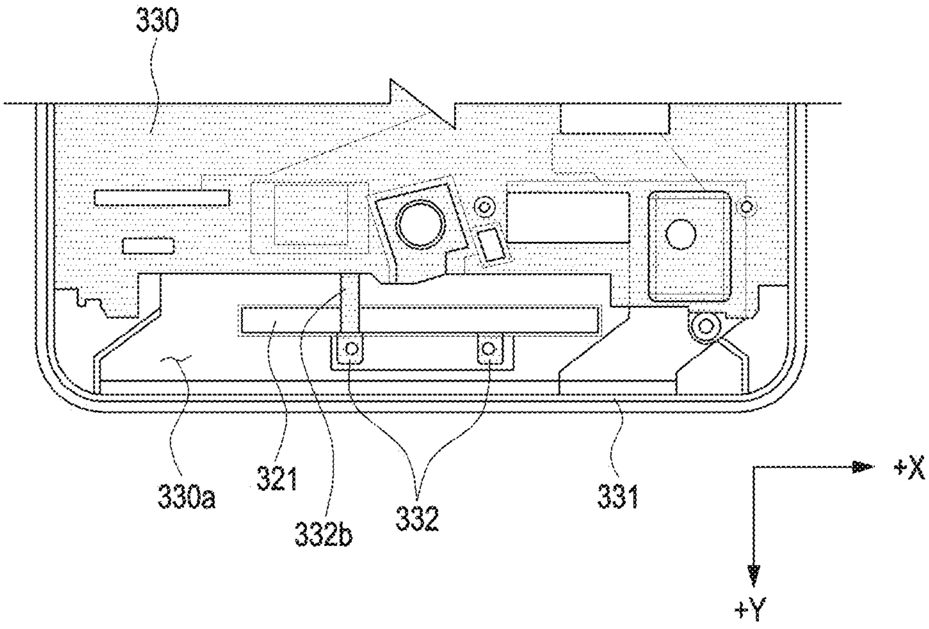
FIG. 21 is a diagram illustrating a state in which a conductive island and a supporting member are connected according to various embodiments.

FIG. 21 is a diagram illustrating a state in which a conductive island 332 and a supporting member 330 are connected according to various embodiments.

Referring to FIG. 21, the conductive island 332 may include a second extension portion **332*b* elongated from one side of any one of the pair of conductive islands 332. As another example, unlike shown in FIG. 21, each of the pair of conductive islands 332 may include the first extension portion 332*a* formed on one side thereof. The second extension portion 332*b* may be a component for connecting the conductive island 332 and the supporting member 330. When the conductive island 332 is not connected to the ground sheet 328, another path for grounding the conductive island 332 may be provided using the second extension portion 332*b* connecting the conductive island 332 to the supporting member 330**.

Figure 22A:
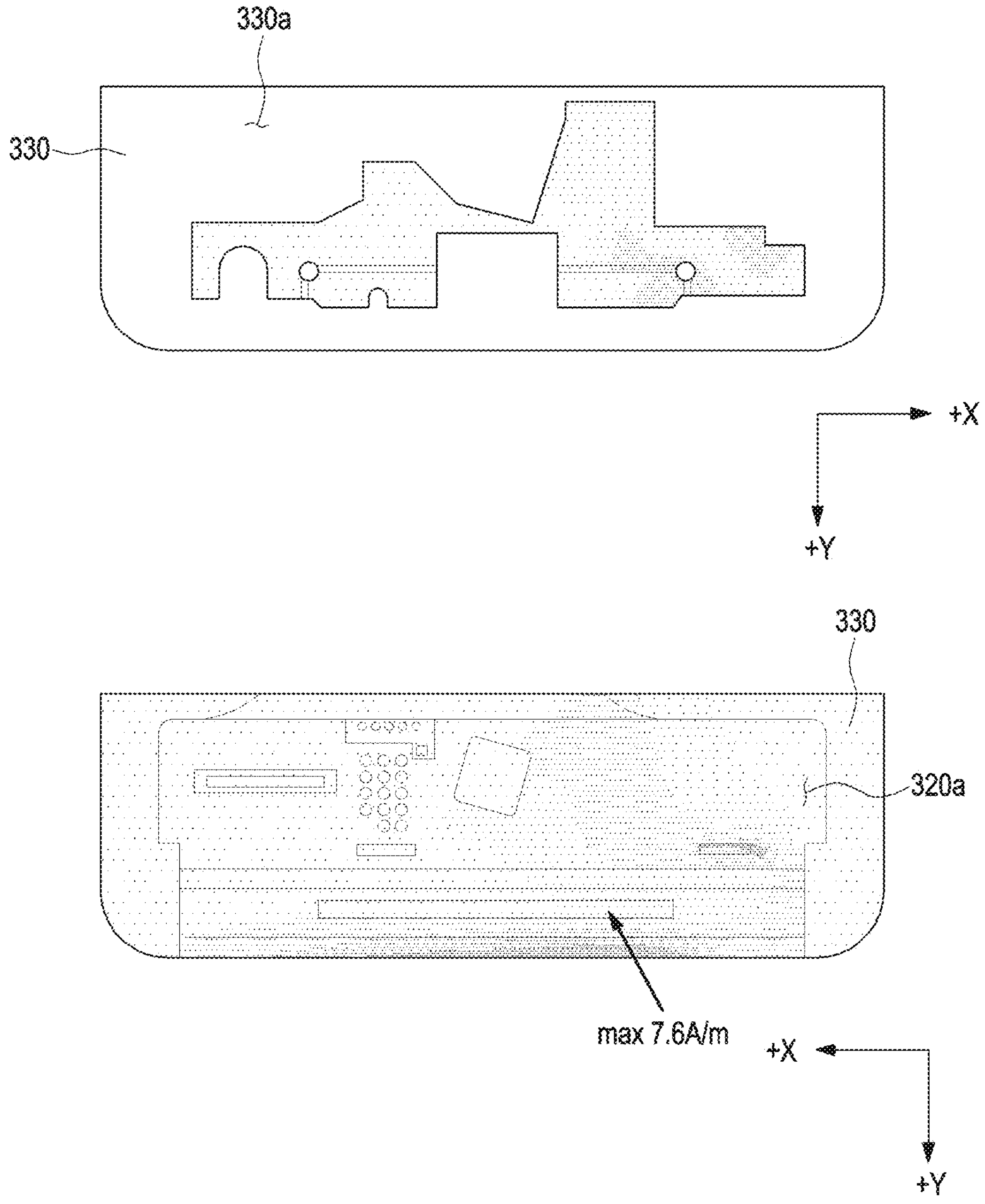
FIG. 22A is a diagram illustrating a simulation of distribution of current flowing when TX power is induced at a DDI according to a comparative embodiment.
Figure 22B:
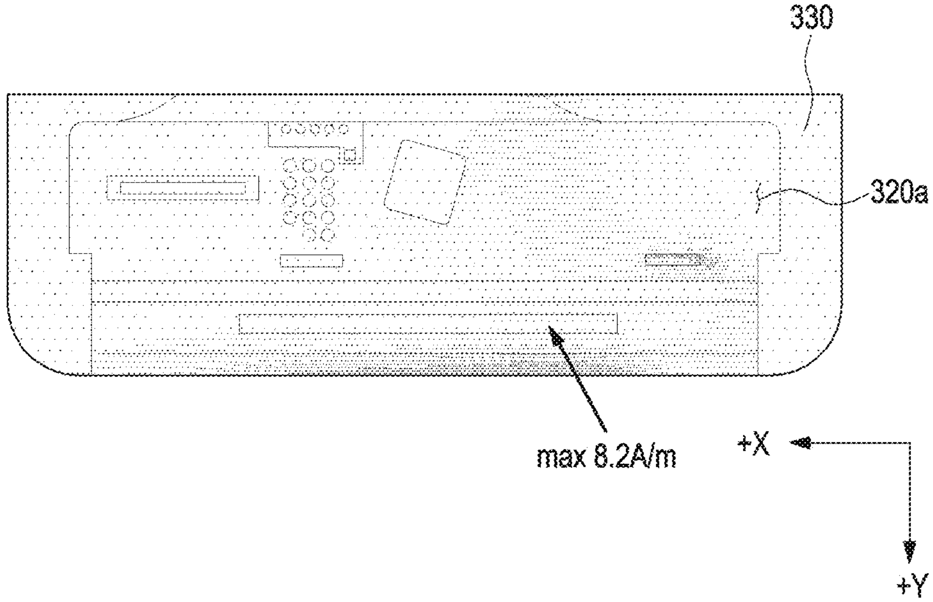
FIG. 22B is a diagram illustrating a simulation of distribution of current flowing when TX power is induced at a DDI according to another comparative embodiment.
Figure 22C:
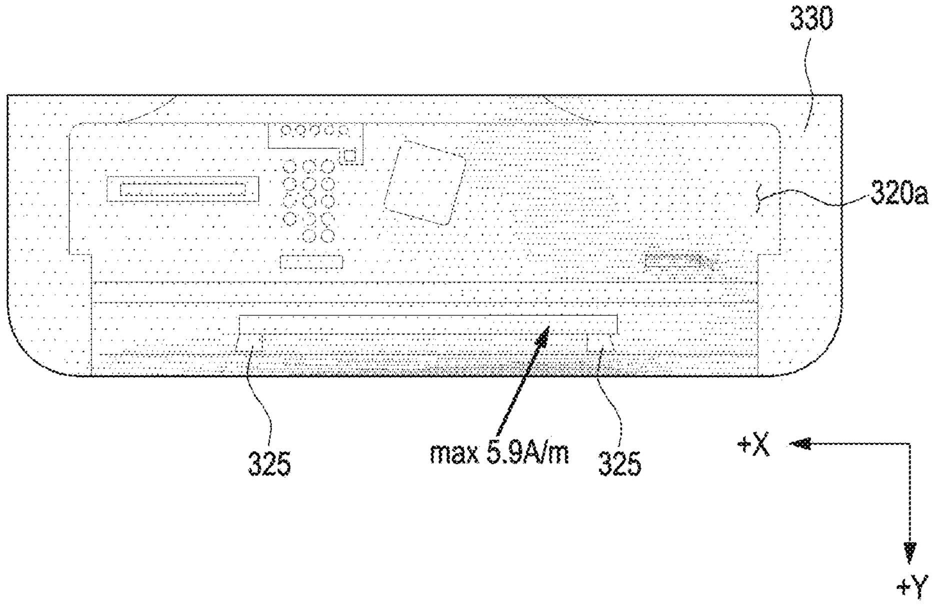
FIG. 22C is a diagram illustrating a simulation of distribution of current flowing when TX power is induced at a DDI according to various embodiments.

FIG. 22A is a diagram illustrating a simulation of distribution of current flowing when TX power is induced at a DDI according to a comparative embodiment. FIG. 22B is a diagram illustrating a simulation of distribution of current flowing when TX power is induced at a DDI according to another comparative embodiment. FIG. 22C is a diagram illustrating a simulation of distribution of current flowing when TX power is induced at a DDI according to various embodiments of the disclosure.

FIG. 22A is a diagram illustrating a comparative embodiment, and may show a simulation result of an electronic device including a shielding sheet on each of a rear surface 320*a* of the display 320 and one surface 330*a* of the supporting member 330. FIG. 22B is a diagram illustrating another comparative embodiment, and may show a simulation result of an electronic device including a shielding sheet only on the rear surface of the display 320. FIG. 22C is a diagram illustrating a simulation result of an electronic device including a shielding sheet only on the rear surface of the display 320 and forming a grounding point using the conductive member 325 between the DDI 321 and the antenna 390 according to various embodiments of the disclosure. In this case, FIGS. 22A to 22C may show a current distribution in a state in which Tx power of the same magnitude is induced from the antenna 390.

Referring to FIG. 22A, when the shielding sheet is included on each of the rear surface 320*a* of the display 320 and the one surface 330*a* of the supporting member 330, it may be identified that a current of up to 7.6 A/m flows near the DDI. Referring to FIGS. 22A and 22B together, when the shielding sheet is provided only on the rear surface 320*a* of the display 320, it may be identified that a current of up to 8.2 A/m flows around the DDI. Referring to FIG. 22C, when the shielding sheet is removed from one surface 330*a* of the supporting member 330 and the shielding sheet is provided only on the rear surface 320*a* of the display 320, it may be identified that a current of 5.9 A/m, which is significantly reduced from that in the embodiment illustrated in FIG. 22B, flows. Further, as compared with FIG. 22A, even when the shielding sheet is provided only on the rear surface 320*a* of the display 320, it may be identified that a current significantly smaller than the current value measured in FIG. 22A flows.

As such, in the electronic device according to various embodiments of the disclosure, by forming a grounding point using the conductive member 325 between the DDI 321 and the antenna 390, Tx power reinduced to the antenna through the DDI may be reduced, thereby preventing and/or reducing antenna sensitivity deterioration.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments, there may be provided an electronic device (e.g., the electronic device 101 of FIG. 17) comprising: a housing (e.g., the housing 210 of FIGS. 2 and 3 (or the side bezel structure 331 of FIG. 17)), a display (e.g., the display 320 of FIG. 17), a ground sheet (e.g., the ground sheet 328 of FIG. 17) disposed on a rear surface of the display, a substrate (e.g., the substrate 324 of FIG. 17) disposed in an inner space of the housing, an antenna (e.g., the antenna 390 of FIG. 17) disposed on one side of the housing, and a flexible sheet (e.g., the flexible sheet 322 of FIG. 17) including a display drive IC configured to control the display, disposed thereon, wherein an opening (e.g., the opening 326 of FIG. 17) through the flexible sheet is provided in an area between the display drive IC and the antenna, wherein a conductive member, comprising a conductive material (e.g., the conductive member 325 of FIG. 17), is disposed in the opening, and wherein noise induced at the antenna is reduced based on the conductive member being electrically connected to the ground sheet.

According to various example embodiments, at least a portion of the housing may include a metal frame, and the antenna may be configured to perform communication with another electronic device using the metal frame.

According to various example embodiments, the conductive member may comprise an elastic material including at least one of sponge, foam, or poron or comprises a c-clip.

According to various example embodiments, the flexible sheet may be include one of a flexible printed circuit board or a flexible film or a combination of the flexible printed circuit board and the flexible film.

According to various example embodiments, the flexible sheet may be at least partially bent at a position adjacent to one side of the housing.

According to various example embodiments, the flexible sheet may electrically connect the display and the substrate in a chip on film (COF), chip on panel (COP), or chip on glass (COG) manner.

According to various example embodiments, the electronic device may further comprise a shielding sheet (e.g., the shielding sheet 323 of FIG. 17) configured to shield noise of the display drive IC.

According to various example embodiments, the shielding sheet may be disposed on a rear surface (e.g., the rear surface 320*a* of the display of FIG. 5) of the display, on one surface of a support (e.g., the supporting member 330 of FIG. 17) inside the housing, or on each of the rear surface of the display and the one surface of the support.

According to various example embodiments, the opening may be formed through the flexible sheet and the shielding sheet.

According to various example embodiments, the flexible sheet may include a plurality of conductive lines electrically connecting the display and the display drive IC, and the plurality of conductive lines may be configured to avoid the opening.

According to various example embodiments, a plurality of openings may be formed, and the conductive member may be disposed corresponding to the number of the openings.

According to various example embodiments, the conductive member may be disposed to be stacked with a conductive island (e.g., the conductive island 332 of FIG. 17) formed in the housing, along a height direction of the electronic device at a position corresponding to the conductive island.

According to various example embodiments, the conductive island may be fixedly disposed on a support inside the housing.

According to various example embodiments, the support may include a conductive portion spaced apart from the conductive island and a non-conductive portion surrounding the conductive island.

According to various example embodiments, the conductive island may include a metal bracket for screw assembly configured to fix a socket inside the housing.

According to various example embodiments of the disclosure, there may be provided an electronic device comprising: a housing including a metal frame, a display, a ground sheet disposed on a rear surface of the display, a substrate disposed in an inner space of the housing, an antenna configured to perform communication with another electronic device using the metal frame, a flexible sheet having a display drive IC configured to control the display, disposed thereon, and a shielding sheet configured to shield noise of the display drive IC, wherein an opening through the flexible sheet and the shielding sheet is provided in an area between the display drive IC and the antenna, wherein a conductive member comprising a conductive material is disposed through the opening and is spaced apart from the display drive IC by a specified interval in a first direction, and wherein the conductive member is connected to the ground sheet on one surface and is stacked with a conductive island formed in the housing along a second direction perpendicular to the first direction, on another surface.

According to various example embodiments, the conductive member may comprise an elastic material including sponge, foam, or poron or includes a c-clip.

According to various example embodiments, the flexible sheet may be include one of a flexible printed circuit board or a flexible film or a combination of the flexible printed circuit board and the flexible film.

According to various example embodiments of the disclosure, there may be provided an electronic device comprising: a housing, a display, a ground sheet disposed on a rear surface of the display, a substrate disposed in an inner space of the housing, an antenna disposed on at least one side of the housing, and a flexible sheet having a display drive IC configured to control the display, disposed thereon, wherein the flexible sheet forms a first grounding point (e.g., the first grounding point P1 of FIG. 19) through an electrical connection with the substrate, and wherein noise induced at the antenna is reduced by forming a second grounding point (e.g., the second grounding point P2 of FIG. 19) through a conductive member comprising a conductive material disposed in an area between the display drive IC and the antenna and disposed to be connected to the ground sheet on one surface and stacked with a conductive island formed in the housing on another surface.

The conductive member may be disposed in an opening formed through the flexible sheet.

While the disclosure has been illustrated and described with reference to various example embodiments it will be understood that the various example embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device, comprising:

a housing;

a display;

a ground sheet disposed on a rear surface of the display;

a substrate disposed in an inner space of the housing;

an antenna disposed on one side of the housing; and a flexible sheet having a display drive IC configured to control the display, disposed thereon, wherein an opening through the flexible sheet is provided in an area between the display drive IC and the antenna, wherein a conductive member comprising a conductive material is disposed in the opening, and wherein noise induced at the antenna is reduced based on the conductive member being electrically connected to the ground sheet.

2. The electronic device of claim 1, wherein at least a portion of the housing includes a metal frame, and wherein the antenna is configured to perform communication with another electronic device using the metal frame.

3. The electronic device of claim 1, wherein the conductive member includes an elastic material including sponge, foam, or poron or includes a c-clip.

4. The electronic device of claim 1, wherein the flexible sheet includes one of a flexible printed circuit board or a flexible film or a combination of the flexible printed circuit board and the flexible film.

5. The electronic device of claim 1, wherein the flexible sheet is at least partially bent at a position adjacent to one side of the housing.

6. The electronic device of claim 1, wherein the flexible sheet is configured to electrically connect the display and the substrate in a chip on film (COF), chip on panel (COP), or chip on glass (COG) manner.

7. The electronic device of claim 1, further comprising a shielding sheet configured to shield noise of the display drive IC.

8. The electronic device of claim 7, wherein the shielding sheet is disposed on a rear surface of the display, on one surface of a support inside the housing, or on each of the rear surface of the display and the one surface of the support.

9. The electronic device of claim 7, wherein the opening extends through the flexible sheet and the shielding sheet.

10. The electronic device of claim 1, wherein the flexible sheet includes a plurality of conductive lines electrically connecting the display and the display drive IC, and wherein the plurality of conductive lines are configured to avoid the opening.

11. The electronic device of claim 10, wherein a plurality of openings are formed, and wherein the conductive member is disposed corresponding to the openings.

12. The electronic device of claim 1, wherein the conductive member is disposed to be stacked with a conductive island formed in the housing, along a height direction of the electronic device at a position corresponding to the conductive island.

13. The electronic device of claim 12, wherein the conductive island is fixedly disposed on a support inside the housing.

14. The electronic device of claim 13, wherein the support includes a conductive portion spaced apart from the conductive island and a non-conductive portion surrounding the conductive island.

15. The electronic device of claim 12, wherein the conductive island includes a metal bracket configured for screw assembly and fixing a socket inside the housing.

16. An electronic device, comprising:

a housing including a metal frame;

a display;

a ground sheet disposed on a rear surface of the display;

a substrate disposed in an inner space of the housing;

an antenna performing communication with another electronic device using the metal frame;

a flexible sheet including a display drive IC for configured to control the display, disposed thereon; and a shielding sheet for shielding noise of the display drive IC, wherein an opening is formed to penetrate the flexible sheet and the shielding sheet in an area between the display drive IC and the antenna, wherein a conductive member comprising a conductive material is included which is disposed through the opening and is spaced apart from the display drive IC by a predetermined interval in a first direction, and wherein the conductive member is connected to the ground sheet on one surface and is stacked with a conductive island formed in the housing along a second direction perpendicular to the first direction, on another surface.

17. The electronic device of claim 16, wherein the conductive member is formed of an elastic material including sponge, foam, or poron or is formed to include a c-clip.

18. The electronic device of claim 16, wherein the flexible sheet is formed of one of a flexible printed circuit board or a flexible film or a combination of the flexible printed circuit board and the flexible film.

19. An electronic device, comprising:

a housing;

a display;

a ground sheet disposed on a rear surface of the display;

a substrate disposed in an inner space of the housing;

an antenna disposed on at least one side of the housing; and a flexible sheet including a display drive IC configured to control the display, disposed thereon, wherein the flexible sheet is configured to form a first grounding point through an electrical connection with the substrate, and wherein a conductive member comprising a conductive material is disposed in an area between the display drive IC and the antenna and is connected to the ground sheet on one surface of the conductive member and is stacked with a conductive island formed in the housing on another surface of the conductive member, such that noise induced at the antenna is reduced.

20. The electronic device of claim 19, wherein the conductive member is disposed in an opening formed to penetrate the flexible sheet.

* * * * *